(12) United States Patent
Zhu et al.

(10) Patent No.: US 11,424,812 B1
(45) Date of Patent: Aug. 23, 2022

(54) VIDEO BASED CHANNEL STATE INFORMATION

(71) Applicant: QUALCOMM Incorporated, San Diego, CA (US)

(72) Inventors: Xipeng Zhu, San Diego, CA (US); Duo Zhang, San Diego, CA (US); Fei Huang, San Diego, CA (US); Tingfang Ji, San Diego, CA (US); Vijay Shirsathe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,419

(22) Filed: May 28, 2021

(51) Int. Cl.
*H04B 7/08* (2006.01)
*H04B 7/06* (2006.01)
*H04W 64/00* (2009.01)
*H04W 52/28* (2009.01)
*H04W 72/04* (2009.01)
*H04W 72/12* (2009.01)
*H04B 17/309* (2015.01)

(52) U.S. Cl.
CPC ........... *H04B 7/086* (2013.01); *H04B 7/0639* (2013.01); *H04B 17/309* (2015.01); *H04W 52/28* (2013.01); *H04W 64/006* (2013.01); *H04W 72/046* (2013.01); *H04W 72/048* (2013.01); *H04W 72/1231* (2013.01)

(58) Field of Classification Search
CPC .... H04B 7/086; H04B 17/309; H04B 7/0639; H04W 52/28; H04W 64/006; H04W 72/046; H04W 72/048; H04W 72/1231
See application file for complete search history.

(56) References Cited

U.S. PATENT DOCUMENTS

| | | | |
|---|---|---|---|
| 9,516,409 B1* | 12/2016 | Ramprashad | H04R 3/02 |
| 2017/0332406 A1* | 11/2017 | Islam | H04B 7/0408 |
| 2019/0075430 A1* | 3/2019 | Lincoln | H04W 24/10 |
| 2021/0058131 A1* | 2/2021 | Zhu | H04B 7/0408 |

\* cited by examiner

*Primary Examiner* — Jaison Joseph
(74) *Attorney, Agent, or Firm* — Harrity & Harrity, LLP

(57) ABSTRACT

Various aspects of the present disclosure generally relate to wireless communication. In some aspects, a user equipment (UE) may receive a video-based channel state information (VCSI) configuration. The UE may cause a camera to capture channel state information (CSI) video based at least in part on one or more VCSI measurement parameters indicated in the VCSI configuration. The UE may derive, from the CSI video, one or more VCSI measurements using a machine learning model indicated in the VCSI configuration. The UE may transmit a VCSI report that includes the one or more VCSI measurements. Numerous other aspects are described.

30 Claims, 13 Drawing Sheets

VIDEO BASED CHANNEL STATE INFORMATION

FIELD OF THE DISCLOSURE

Aspects of the present disclosure generally relate to wireless communication and to techniques and apparatuses for video-based channel state information (VCSI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a video-based channel state information (VCSI) configuration; causing a camera to capture channel state information (CSI) video based at least in part on one or more VCSI measurement parameters indicated in the VCSI configuration; deriving, from the CSI video, one or more VCSI measurements using a machine learning model indicated in the VCSI configuration; and transmitting a VCSI report that includes the one or more VCSI measurements.

In some aspects, a method of wireless communication performed by a base station includes transmitting a VCSI configuration that indicates one or more VCSI measurement parameters and a machine learning model associated with processing CSI video that is based at least in part on the one or more VCSI measurement parameters; receiving a VCSI report that includes one or more VCSI measurements associated with a UE; and scheduling one or more uplink or downlink transmissions for the UE based at least in part on the one or more VCSI measurements.

In some aspects, a method of wireless communication performed by a base station includes configuring a radio unit (RU) to capture CSI video; causing the CSI video to be delivered from the RU to a distributed unit (DU) via a fronthaul interface; deriving, by the DU, one or more VCSI measurements from the CSI video using a machine learning model; and scheduling one or more uplink or downlink transmissions based at least in part on the one or more VCSI measurements.

In some aspects, a UE for wireless communication includes a memory and one or more processors, coupled to the memory, configured to: receive a VCSI configuration; cause a camera to capture CSI video based at least in part on one or more VCSI measurement parameters indicated in the VCSI configuration; derive, from the CSI video, one or more VCSI measurements using a machine learning model indicated in the VCSI configuration; and transmit a VCSI report that includes the one or more VCSI measurements.

In some aspects, a base station for wireless communication includes a memory and one or more processors, coupled to the memory, configured to: transmit a VCSI configuration that indicates one or more VCSI measurement parameters and a machine learning model associated with processing CSI video that is based at least in part on the one or more VCSI measurement parameters; receive a VCSI report that includes one or more VCSI measurements associated with a UE; and schedule one or more uplink or downlink transmissions for the UE based at least in part on the one or more VCSI measurements.

In some aspects, a base station for wireless communication includes a memory and one or more processors, coupled to the memory, configured to: configure an RU to capture CSI video; cause the CSI video to be delivered from the RU to a DU via a fronthaul interface; derive one or more VCSI measurements from the CSI video using a machine learning model; and schedule one or more uplink or downlink transmissions based at least in part on the one or more VCSI measurements.

In some aspects, a non-transitory computer-readable medium storing a set of instructions for wireless communication includes one or more instructions that, when executed by one or more processors of a UE, cause the UE to: receive a VCSI configuration; cause a camera to capture CSI video based at least in part on one or more VCSI measurement parameters indicated in the VCSI configuration; derive, from the CSI video, one or more VCSI measurements using a machine learning model indicated in the VCSI configuration; and transmit a VCSI report that includes the one or more VCSI measurements.

In some aspects, a non-transitory computer-readable medium storing a set of instructions for wireless communication includes one or more instructions that, when executed by one or more processors of a base station, cause the base station to: transmit a VCSI configuration that indicates one or more VCSI measurement parameters and a machine learning model associated with processing CSI video that is based at least in part on the one or more VCSI measurement parameters; receive a VCSI report that includes one or more VCSI measurements associated with a UE; and schedule one or more uplink or downlink transmissions for the UE based at least in part on the one or more VCSI measurements.

In some aspects, a non-transitory computer-readable medium storing a set of instructions for wireless communication includes one or more instructions that, when executed by one or more processors of a base station, cause the base station to: configure an RU to capture CSI video; cause the CSI video to be delivered from the RU to a DU via a fronthaul interface; derive one or more VCSI measurements from the CSI video using a machine learning model; and schedule one or more uplink or downlink transmissions based at least in part on the one or more VCSI measurements.

In some aspects, an apparatus for wireless communication includes means for receiving a VCSI configuration; means for causing a camera to capture CSI video based at least in part on one or more VCSI measurement parameters indicated in the VCSI configuration; means for deriving, from the CSI video, one or more VCSI measurements using a machine learning model indicated in the VCSI configuration; and means for transmitting a VCSI report that includes the one or more VCSI measurements.

In some aspects, an apparatus for wireless communication includes means for transmitting a VCSI configuration that indicates one or more VCSI measurement parameters and a machine learning model associated with processing CSI video that is based at least in part on the one or more VCSI measurement parameters; means for receiving a VCSI report that includes one or more VCSI measurements associated with a UE; and means for scheduling one or more uplink or downlink transmissions for the UE based at least in part on the one or more VCSI measurements.

In some aspects, an apparatus for wireless communication includes means for configuring an RU to capture CSI video; means for causing the CSI video to be delivered from the RU to a DU via a fronthaul interface; means for deriving one or more VCSI measurements from the CSI video using a machine learning model; and means for scheduling one or more uplink or downlink transmissions based at least in part on the one or more VCSI measurements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
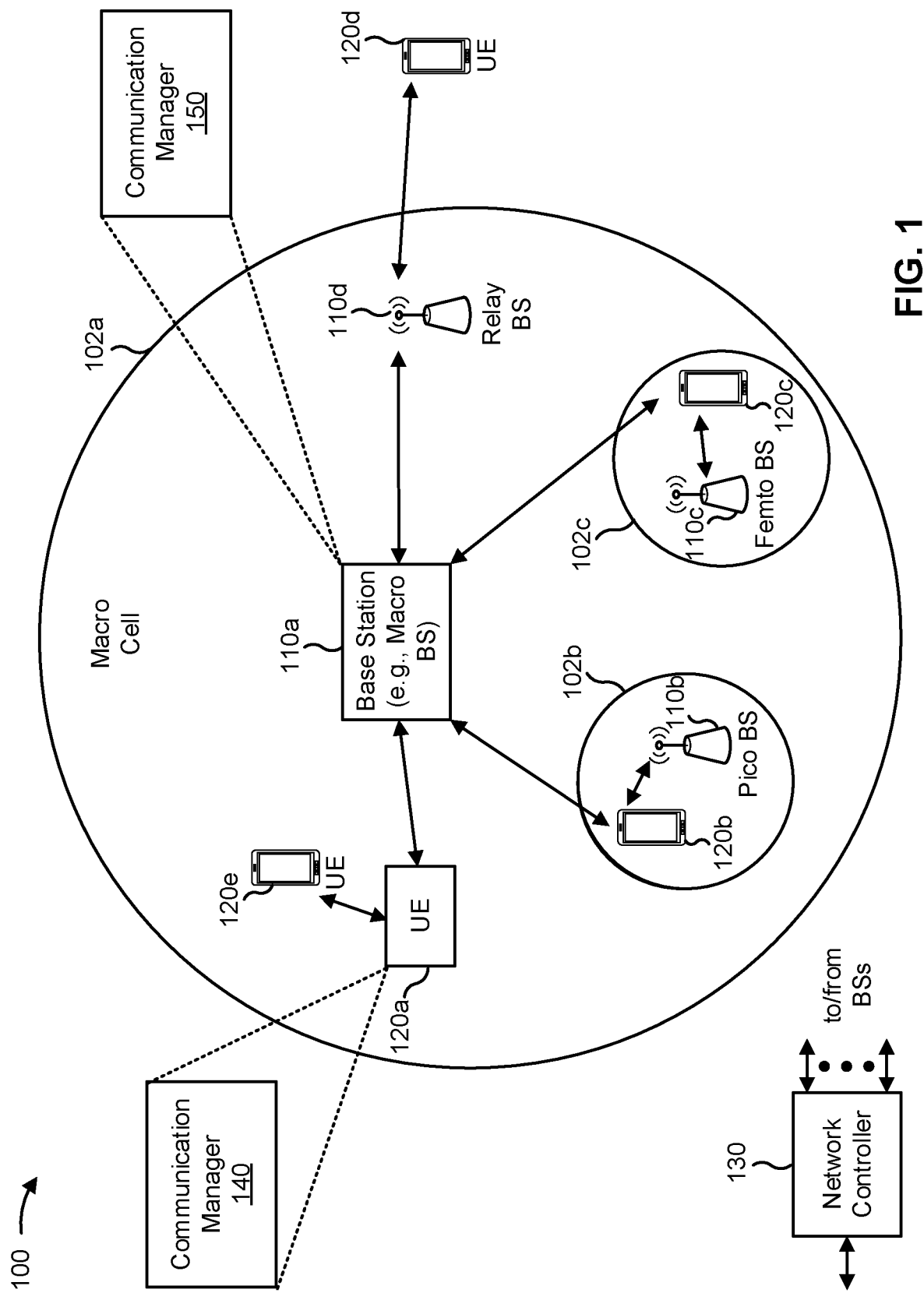
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive a video-based channel state information (VCSI) configuration; cause a camera to capture channel state information (CSI) video based at least in part on one or more VCSI measurement parameters indicated in the VCSI configuration; derive, from the CSI video, one or more VCSI measurements using a machine learning model indicated in the VCSI configuration; and transmit a VCSI report that includes the one or more VCSI measurements. Additionally, or alternatively, the communication manager 140 may perform one or more other operations described herein.

In some aspects, the base station 110 may include a communication manager 150. As described in more detail elsewhere herein, the communication manager 150 may transmit a VCSI configuration that indicates one or more VCSI measurement parameters and a machine learning model associated with processing CSI video that is based at least in part on the one or more VCSI measurement parameters; receive a VCSI report that includes one or more VCSI measurements associated with a UE; and schedule one or more uplink or downlink transmissions for the UE based at least in part on the one or more VCSI measurements. Additionally, or alternatively, the communication manager 150 may configure a radio unit (RU) to capture CSI video; cause the CSI video to be delivered from the RU to a distributed unit (DU) via a fronthaul interface; derive one or more VCSI measurements from the CSI video using a machine learning model; and schedule one or more uplink or downlink transmissions based at least in part on the one or more VCSI measurements. Additionally, or alternatively, the communication manager 150 may perform one or more other operations described herein.

As indicated above, FIG. 1 is provided as an example. Other examples may differ from what is described with regard to FIG. 1.

Figure 2:
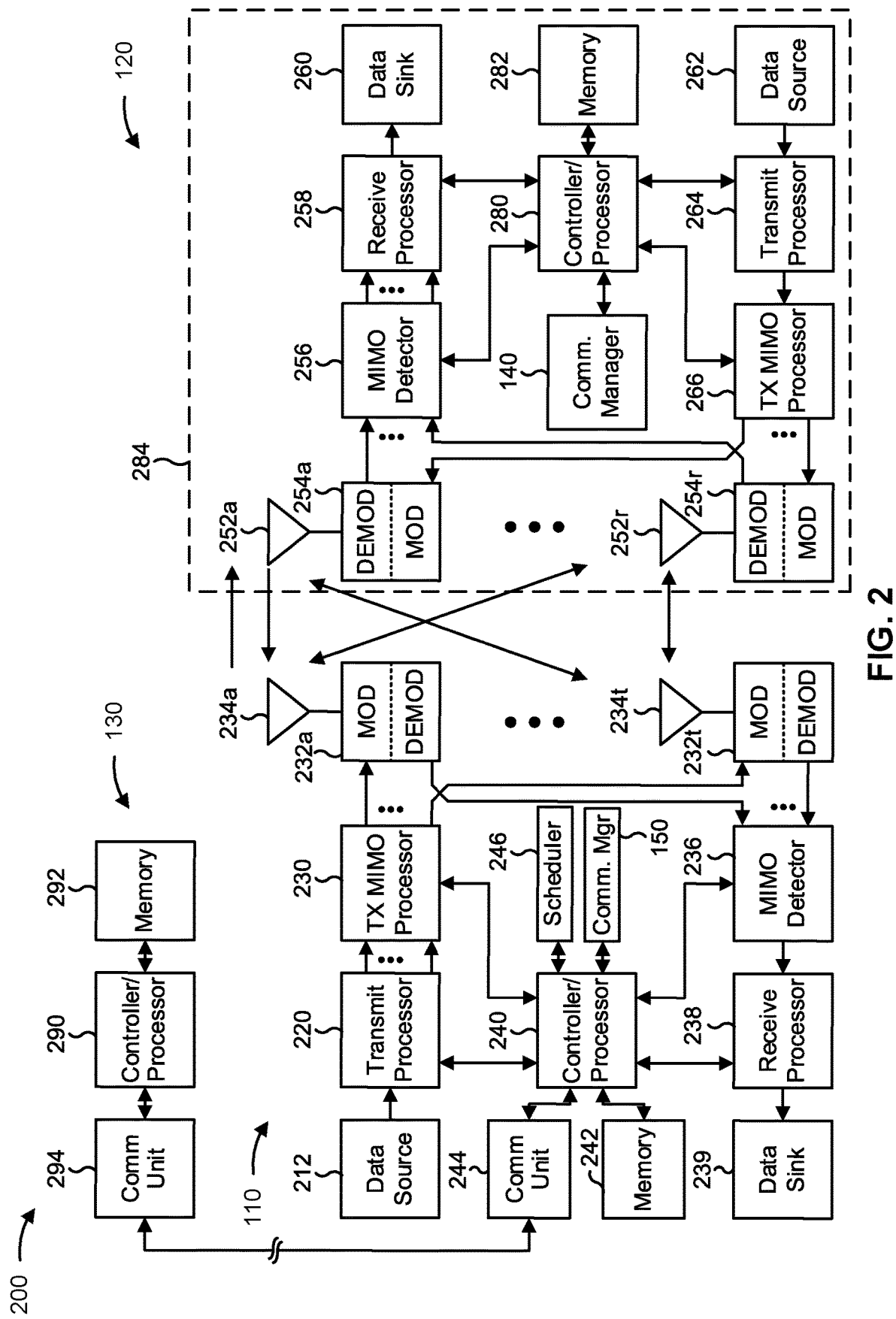
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIGS. 4-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIGS. 4-9).

Controller/processor 240 of base station 110, controller/processor 280 of UE 120, and/or any other component(s) of FIG. 2 may perform one or more techniques associated with video-based channel state information (VCSI), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving a VCSI configuration; means for causing a camera to capture CSI video based at least in part on one or more VCSI measurement parameters indicated in the VCSI configuration; means for deriving, from the CSI video, one or more VCSI measurements using a machine learning model indicated in the VCSI configuration; and/or means for transmitting a VCSI report that includes the one or more VCSI measurements. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station 110 includes means for transmitting a VCSI configuration that indicates one or more VCSI measurement parameters and a machine learning model associated with processing CSI video that is based at least in part on the one or more VCSI measurement parameters; means for receiving a VCSI report that includes one or more VCSI measurements associated with a UE 120; and/or means for scheduling one or more uplink or downlink transmissions for the UE 120 based at least in part on the one or more VCSI measurements. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for configuring an RU to capture CSI video; means for causing the CSI video to be delivered from the RU to a DU via a fronthaul interface; means for deriving, by the DU, one or more VCSI measurements from the CSI video using a machine learning model; and/or means for scheduling one or more uplink or downlink transmissions based at least in part on the one or more VCSI measurements. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
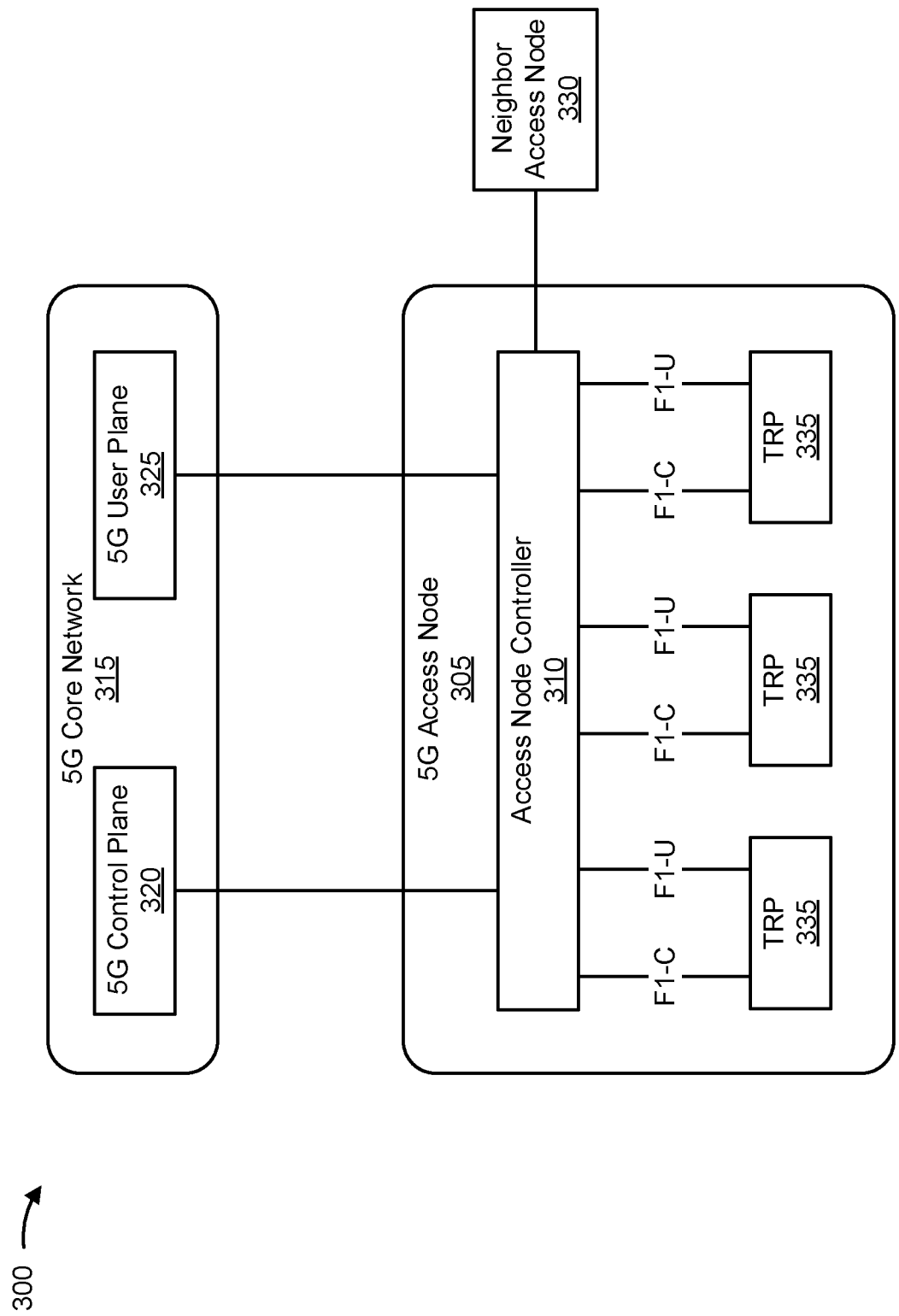
FIG. 3 is a diagram illustrating an example of a distributed radio access network, in accordance with the present disclosure.

FIG. 3 is a diagram illustrating an example 300 of a logical architecture that may be used in a distributed radio access network (RAN), in accordance with the present disclosure.

As shown in FIG. 3, a 5G access node 305 may include an access node controller 310. The access node controller 310 may be a central unit (CU) of the distributed RAN. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for the 5G control plane component 320 and/or the 5G user plane component 325 may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN. For example, a packet data convergence protocol (PDCP) layer, a radio link control (RLC) layer, and/or a medium access control (MAC) layer may be configured to terminate at the access node controller 310 or at a TRP 335. Furthermore, in some aspects, a TRP 335 may include or may be connected to a radio unit (RU) of the distributed RAN. For example, the RU may be configured to handle a digital front end and digital beamforming functionality, and parts of a physical (PHY) layer may be implemented at the RU or the DU, depending on the dynamic configuration of split logical functions within the architecture of distributed RAN.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
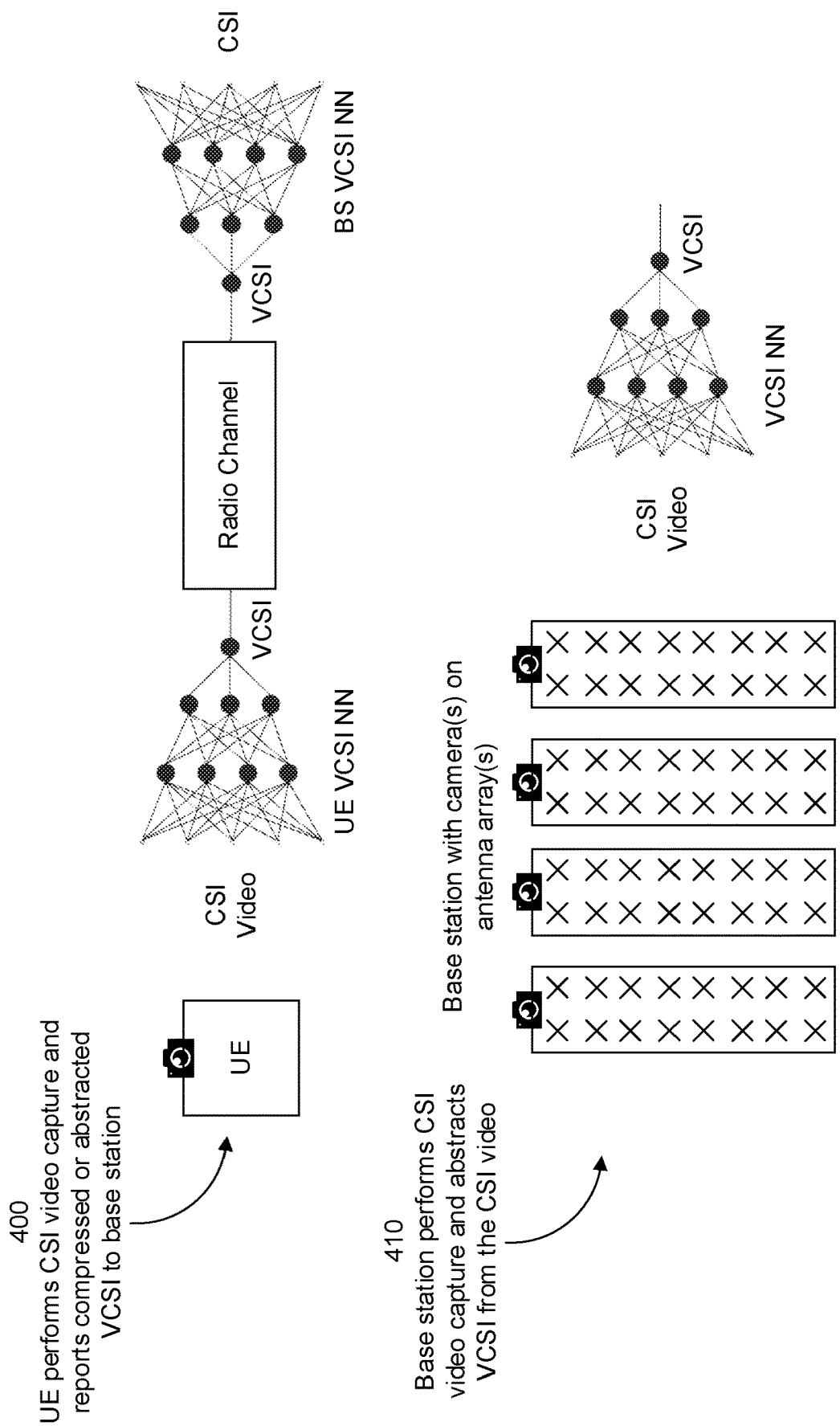
FIG. 4 is a diagram illustrating examples associated with video-based channel state information (VCSI), in accordance with the present disclosure.

FIG. 4 is a diagram illustrating examples 400, 410 associated with video-based channel state information, in accordance with the present disclosure. In a wireless network, channel state information (CSI) generally includes various parameters that relate to properties associated with a wireless channel and represent how a signal propagates from a transmitter to a receiver based on the combined effect of scattering, fading, and/or power decay with distance. Accordingly, CSI can be used to adapt transmissions to current channel conditions, which may increase reliability and/or throughput in the wireless network.

CSI is typically obtained based on one or more reference signal transmissions that can be used for downlink and/or uplink channel estimation. For example, in some aspects, a CSI reference signal (CSI-RS) may carry information used for downlink channel estimation (e.g., downlink CSI acquisition), which a base station may use for scheduling, link adaptation, or beam management, among other examples. The base station may configure a CSI-RS for a UE, and the UE may measure the configured CSI-RS. Based at least in part on the measurements, the UE may perform channel estimation and may report channel estimation parameters to the base station (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station may use the CSI report to select transmission parameters for downlink communications to the UE, such as a number of transmission layers (e.g., a rank), a precoding matrix (e.g., a precoder), a modulation and coding scheme (MCS), or a refined downlink beam (e.g., using a beam refinement procedure or a beam management procedure), among other examples. Additionally, or alternatively, a sounding reference signal (SRS) is an uplink reference signal that may carry information used for uplink channel estimation, which may be used for scheduling, link adaptation, precoder selection, or beam management, among other examples. The base station may configure one or more SRS resource sets for a UE, and the UE may transmit SRSs on the configured SRS resource sets. An SRS resource set may have a configured usage, such as uplink CSI acquisition, downlink CSI acquisition for reciprocity-based operations, uplink beam management, among other examples. The base station may measure the SRSs, may perform channel estimation based at least in part on the measurements, and may use the SRS measurements to configure communications with the UE.

In a wireless network, a channel model may be represented as shown in the expression $Y=H*X+n$, where X is a transmitted signal, Y is a received signal, n is additive noise, and H is a channel matrix derived from CSI that may depend on or otherwise relate to scattering, multipath propagation, a signal-to-noise ratio (SNR), interference, and/or Doppler effects, among other examples. Accordingly, CSI serves an important function to enable high throughput and link reliability in a wireless network, especially to support millimeter wave communication and/or communication at higher frequency bands. For example, although millimeter waves (e.g., in FR2) offer very high throughput, millimeter waves have a wavelength that is significantly shorter than traditional wireless carriers (e.g., in FR1) and are therefore subject to reflection, scattering, blockage, and/or other factors that may cause frequent CSI fluctuation. For example, CSI fluctuation may be caused by factors such as scattering of moving objects (e.g., vehicles or flocks of people), UE mobility (e.g., changes to the position of a UE within a wireless environment), and/or random interferences. In some cases, the factors that cause CSI fluctuation (e.g., object movement and/or changes in UE mobility) may be perceptible or detectable from video that is captured by a device in a wireless environment. However, as described above, existing mechanisms for obtaining CSI are generally limited to measurements that are based on reference signal transmissions.

Some aspects described herein relate to techniques and apparatuses to enable video-based CSI (VCSI). For example, in some aspects, a device in a wireless environment (e.g., a UE and/or a base station) may be equipped with one or more cameras that can be used to capture CSI video of the wireless environment, and an artificial intelligence or machine learning model may be used to abstract the CSI video into CSI that can be used to adapt communication parameters. For example, as shown by example 400, a base station may configure a UE to perform CSI video capture, and the UE may report abstracted or compressed VCSI measurements to the base station. As shown, the CSI video may be input to an artificial intelligence or machine learning model (e.g., a neural network) that outputs VCSI measurements (e.g., abstracted or compressed information associated with the CSI video), and the abstracted or compressed VCSI measurements may be transmitted to the base station over a radio channel. As further shown, the base station may then use an artificial intelligence or machine learning model to derive CSI from the abstracted or compressed VCSI measurements. In some aspects, the UE may be configured to perform the CSI video capture and to report the abstracted or compressed VCSI measurements based on a capability of the UE. For example, CSI video capture and VCSI reporting may be configured on a UE without a power or size restriction (e.g., that may limit placement of a camera), such as a V2X device, a UE with a low-power always-on camera, and/or a dedicated device for video surveillance or CSI sensing (e.g., a streetlight or a camera on a building wall). Additionally, or alternatively, a UE with a power and/or battery constraint may be configured to perform CSI video capture and VCSI reporting in an opportunistic manner (e.g., before a high-priority call or handover).

Additionally, or alternatively, as shown by example 410, a base station may be configured to perform CSI video capture and obtain VCSI measurements using one or more cameras at the base station. For example, a base station may be configured with one or more cameras per beam, one or more cameras per TRP, and/or one or more cameras per antenna element group, among other examples. In this example, in network-based VCSI, CSI video capture may be configured at an antenna element (e.g., at an RU), and the CSI video may be delivered to a DU over a fronthaul interface. As shown, the DU may then input the CSI video to an artificial intelligence or machine learning model (e.g., a neural network) that outputs VCSI measurements abstracted from the CSI video. In some aspects, the UE-based VCSI techniques shown by example 400 and the network-based VCSI techniques shown by example 410 may be performed separately or in combination with one another. In either case, the VCSI may be used to determine one or more channel properties that may cause CSI fluctuation, such as the presence or movement of one or more objects in a wireless environment. In this way, the VCSI can be used for adapting uplink and/or downlink scheduling, positioning, UE measurement configurations and/or mobility decisions, traffic prediction, load balancing, energy saving, and/or any other suitable purpose or use case.

As indicated above, FIG. 4 is provided as an example. Other examples may differ from what is described with regard to FIG. 4.

Figure 5A:
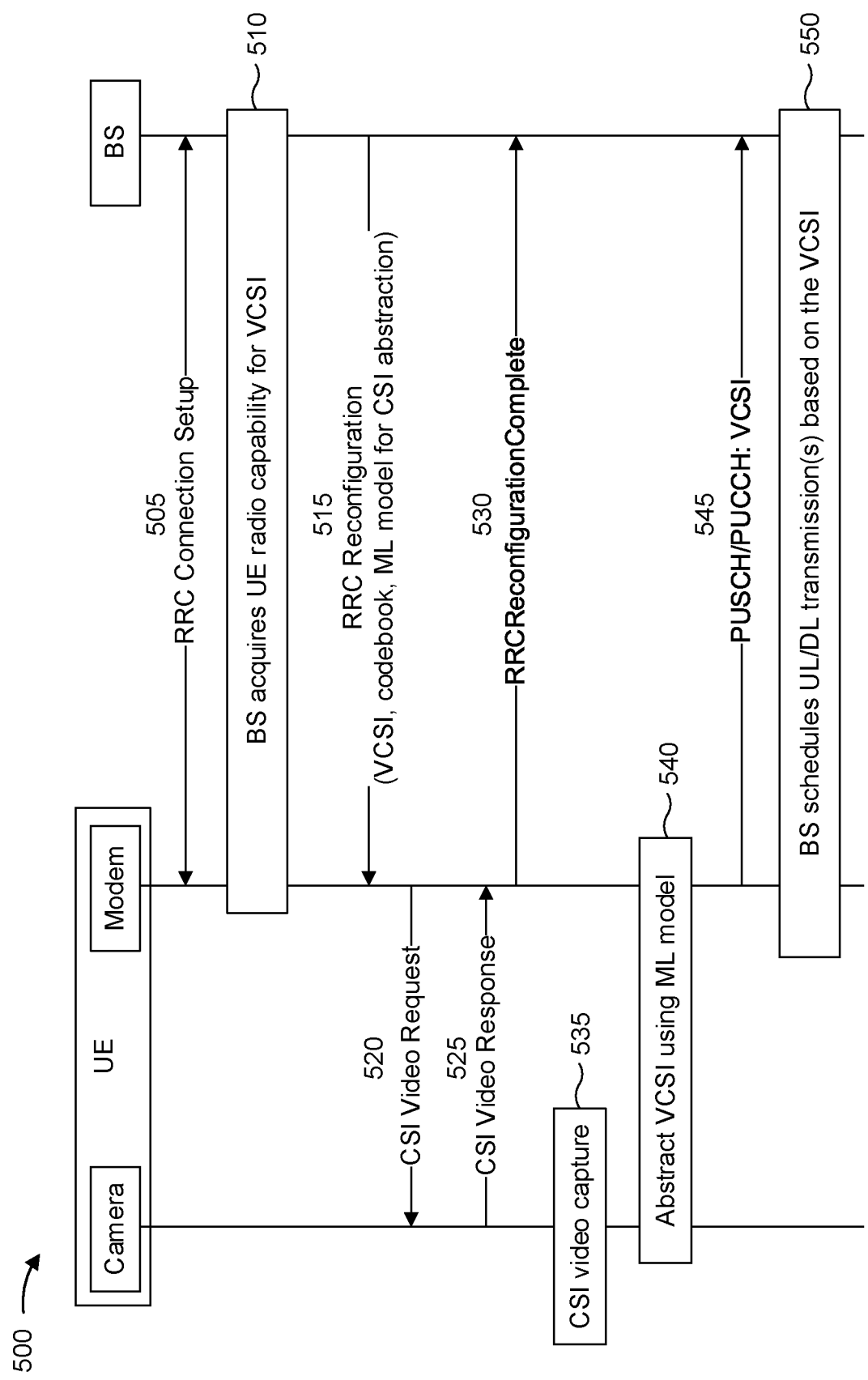
FIGS. 5A-5B are diagrams illustrating examples associated with UE-based VCSI, in accordance with the present disclosure.
Figure 5B:
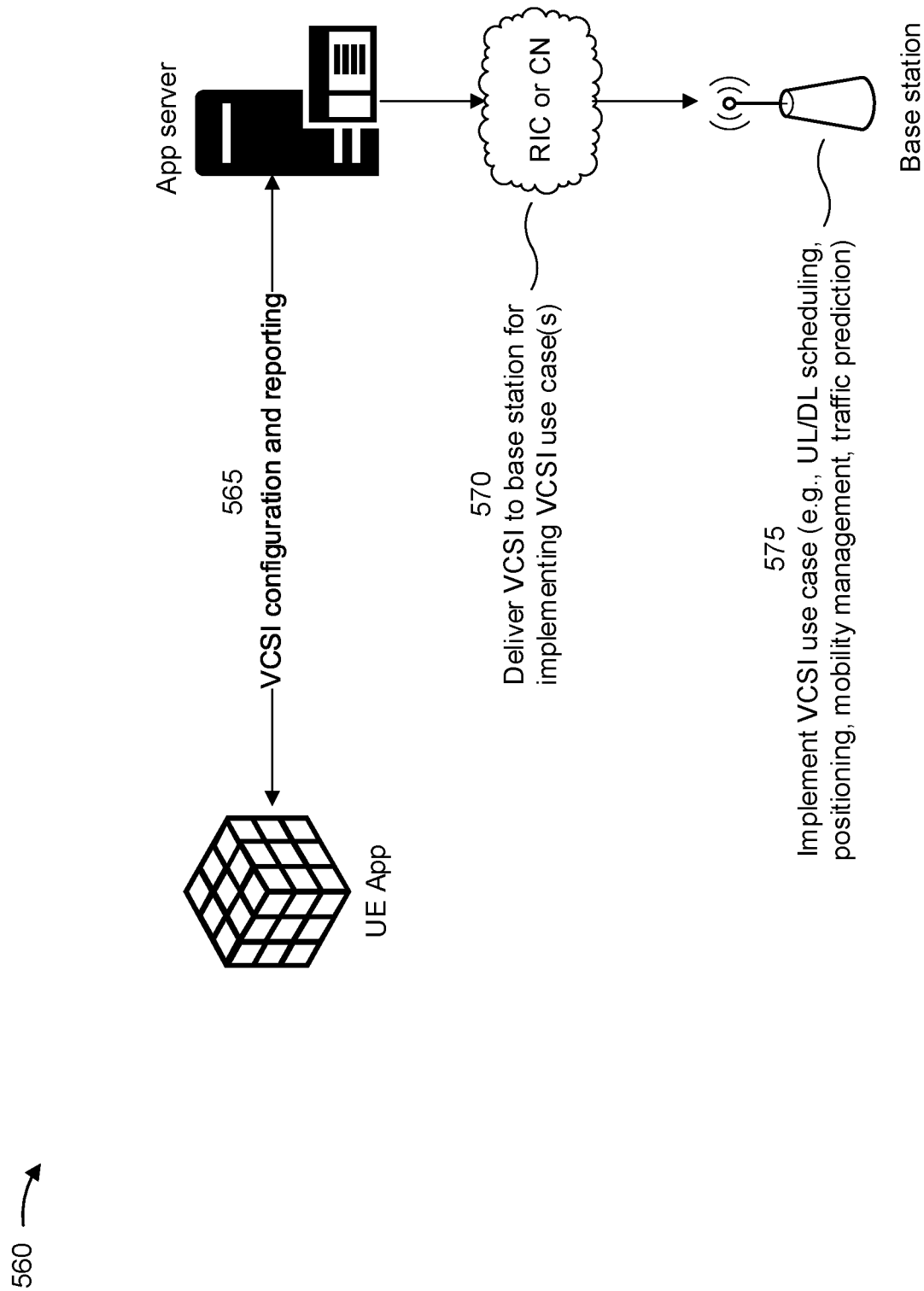

FIGS. 5A-5B are diagrams illustrating examples 500, 560 associated with UE-based VCSI, in accordance with the present disclosure. As shown in FIG. 5A, example 500 includes communication between a UE (e.g., UE 120) and a base station (e.g., base station 110) in a wireless network, such as wireless network 100. In some aspects, the UE and the base station may communicate to enable UE-based VCSI via a wireless access link, which may include an uplink and a downlink. Additionally, or alternatively, as shown in FIG. 5B, example 560 includes an application server that may communicate with the UE and the base station to enable an over-the-top (OTT) VCSI solution for legacy UEs that may otherwise be unable to support the UE-based VCSI techniques shown in FIG. 5A.

As shown in FIG. 5A, and by reference number 505, the UE and the base station may communicate to perform a radio resource control (RRC) connection setup procedure. For example, in some aspects, the UE may generally initiate the RRC connection setup procedure in order to establish an RRC connection by transmitting an RRC connection request to the base station to initiate a random access channel (RACH) procedure, such as a four-step RACH procedure or a two-step RACH procedure. Additionally, or alternatively, the UE may transmit the RRC connection request based on a paging message that the UE receives from the base station while the UE is in an RRC idle mode. In some aspects, the base station may then assign radio resource parameters and a radio network temporary identity (RNTI) to the UE based on the RRC connection request and transmit, to the UE, an RRC connection setup message that includes the radio resource parameters and RNTI assigned to the UE.

As further shown in FIG. 5A, and by reference number 510, the base station may acquire information related to a capability of the UE to perform CSI video capture and/or VCSI reporting. For example, during or after the RRC connection setup procedure, the UE may transmit, and the base station may receive, one or more RRC messages (e.g., an RRC connection setup complete message) that indicate one or more capabilities of the UE. In some aspects, the RRC message(s) indicating the capabilities of the UE may include one or more bits that indicate CSI video capture and/or VCSI reporting capabilities of the UE. For example, in some aspects, the UE capability information may indicate whether the UE supports or lacks support for CSI video capture and/or VCSI reporting. In cases where the UE supports CSI video capture and/or VCSI reporting, the UE capability information may indicate a number of camera lenses that are available for CSI video capture, whether the UE or a camera module associated with the UE has a power or battery constraint, whether the UE supports tracking a direction of the base station, and/or whether the UE supports on-demand direction tuning. In this way, the base station may determine whether and/or how to configure CSI video capture and/or VCSI reporting for the UE based on the CSI video capture and VCSI reporting capabilities of the UE.

As further shown in FIG. 5A, and by reference number 515, the base station may transmit, and the UE may receive, an RRC reconfiguration message that indicates a VCSI configuration based at least in part on the UE capability information indicating that the UE supports CSI video capture and/or VCSI reporting. In some aspects, the VCSI configuration may include one or more camera control parameters that relate to capturing CSI video that is to be used to derive VCSI measurements, a codebook to be used to report the VCSI measurements, and/or a machine learning model that the UE is to use to compress the CSI video and/or derive the VCSI measurements. For example, in some aspects, the one or more camera control parameters may include an identifier of a camera lens to be used to capture CSI video, a camera focus, a direction or beam identifier for the CSI video, a camera activation time, a camera deactivation time, periodic activation and/or deactivation parameters (e.g., a cycle and duration), and/or a network address where the UE is to upload the CSI video (e.g., a Universal Resource Locator (URL) or other address that may be internal to the UE and/or located anywhere on the internet). Furthermore, the VCSI configuration may include an identifier associated with the machine learning model to be used to compress the CSI video and/or derive the VCSI measurements such that the UE may obtain the appropriate machine learning model based on the identifier (e.g., from a network location, or from internal storage if the machine learning model was previously downloaded). Furthermore, in some aspects, the codebook for reporting the VCSI measurements may configure a structure and/or format of the VCSI measurements (e.g., a CSI length indicating a number of bits for the VCSI measurements, a number of unstructured bits to be included in the VCSI report, and/or a configuration for one or more object detection bits that indicate whether one or more humans or objects are detected in the CSI video).

As further shown in FIG. 5A, and by reference number 520, the RRC reconfiguration message that indicates the VCSI configuration may be received at a modem of the UE, and the modem may then provide a CSI video request to an application layer that controls a camera of the UE. For example, in some aspects, the CSI video request may include an attention (AT) command or modem interface signaling that includes the camera control signaling for capturing CSI video. For example, in some aspects, the AT command or modem interface signaling may include the identifier of the camera lens to be used to capture CSI video, the camera focus, the direction or beam identifier for the CSI video, the camera activation time, the camera deactivation time, any periodic activation and/or deactivation parameters, and/or the network address where the application layer is to deliver captured CSI video.

As further shown in FIG. 5A, and by reference number 525, the application layer associated with the camera may provide, to the modem of the UE, a CSI video response message based on the CSI video request message. For example, in some aspects, the CSI video response message may include an acknowledgement for the camera control parameters included in the AT command or modem interface signaling, and may indicate that the camera is able to capture CSI video based on the camera control parameters. As further shown in FIG. 5A, and by reference number 530, the UE may transmit, and the base station may receive, an RRC reconfiguration complete message to acknowledge the VCSI configuration and enter an RRC connected mode.

As further shown in FIG. 5A, and by reference number 535, the application layer of the UE may perform CSI video capture. For example, in some aspects, the application layer of the UE may use the camera to capture CSI video based on the camera control parameters provided by the modem of the UE in the AT command or modem interface signaling. For example, the application layer of the UE may activate (e.g., turn on or otherwise enable) one or more camera lenses to capture video in a particular direction (e.g., a direction associated with a beam identifier). For example, in some aspects, the CSI video may be captured using a standard wide lens, an ultra-wide lens, and/or a telephoto lens, among other examples. Furthermore, in some aspects, the application layer may configure a focus of the one or more camera lenses (e.g., to capture more detail for objects in the foreground or the background) and/or other suitable camera control parameters for capturing the CSI video (e.g., a lighting level, an exposure level, and/or a zoom level, among other examples).

As further shown in FIG. 5A, and by reference number 540, the CSI video captured by the camera may be processed using the machine learning model configured by the base station. For example, as described above, the base station may transmit a VCSI configuration that includes an identifier of the machine learning model to be used to process the captured CSI video, and the UE may use the machine learning model to compress the captured CSI video and/or to abstract the CSI video into VCSI measurements. For example, in some aspects, the VCSI measurements may include information that indicates whether one or more human and/or non-human objects are detected in the CSI video, a position, direction, and/or rate of movement of one or more objects detected in the CSI video, and/or a position, direction, and/or rate of movement of the UE, among other examples. In some aspects, as shown, the CSI video may be compressed and/or abstracted into the VCSI measurements at the application layer, the modem, or jointly at the application layer and the modem.

In some aspects, the machine learning model that is configured by the base station may include any suitable model that can be used to compress the CSI video into unstructured bits and/or abstract the CSI video into VCSI measurements relevant to conditions of a wireless channel corresponding to the CSI video (e.g., an environment that includes a physical path through which wireless signals propagate). For example, in some aspects, the machine learning model may include a neural network (e.g., a convolutional neural network) that can implement a computer vision technique to detect and classify one or more objects depicted in the CSI video and/or movement characteristics associated with one or more objects depicted in the CSI video. For example, in some aspects, the machine learning model may be trained to compress and/or abstract CSI video using an image recognition technique (e.g., an Inception framework, a ResNet framework, and/or a Visual Geometry Group (VGG) framework), an object detection technique (e.g., a Single Shot Detector (SSD) or You Only Look Once (YOLO) framework), an edge detection technique, and/or an object-in-motion technique (e.g., an optical flow framework), among other examples.

As further shown in FIG. 5A, and by reference number 545, the UE may transmit, and the base station may receive, a physical uplink control channel (PUCCH) or a physical uplink shared channel (PUSCH) to carry a VCSI report that includes the VCSI measurements derived from the CSI video. For example, in some aspects, the VCSI report may be transmitted at periodic intervals (e.g., based on an expiration of a periodic VCSI reporting interval) and/or based on a triggering event (e.g., detection of a new human or non-human object and/or a change in position for the UE or a human or non-human object in the environment surrounding the UE, among other examples). Furthermore, in some aspects, the VCSI report may be configured based on the codebook indicated in the VCSI configuration, and may indicate a beam identifier associated with the VCSI measurements, one or more object detection bits to indicate whether one or more humans or objects were detected in the CSI video, information related to the position and/or movement of the UE and/or one or more humans or objects detected in the CSI video, and/or a set of unstructured (e.g., compressed) bits that the UE derived from the CSI video using the machine learning model configured by the base station. For example, in some aspects, the VCSI measurements may include two object detection bits that have a first value (e.g., '00') to indicate that no objects were detected in the CSI video, a second value (e.g., '01') to indicate that one or more humans were detected in the CSI video, a third value (e.g., '10') to indicate that non-human objects were detected in the CSI video, and/or a fourth value (e.g., '11') to indicate that one or more unidentifiable objects were detected in the CSI video.

As further shown in FIG. 5A, and by reference number 550, the base station may use the information included in the VCSI report to implement any suitable VCSI use case, which may include adjusting scheduling parameters for one or more uplink and/or downlink transmissions based on the VCSI measurements. For example, in cases where the VCSI measurements indicate that one or more humans are present in the environment surrounding the UE, the base station may implement one or more mitigation actions such that uplink and/or downlink transmissions are not directed toward the human(s) at a high power (e.g., to avoid human health risks that may be caused by transmitted high frequency millimeter wave signals directly toward a human using a high-power beam). For example, in some aspects, the machine learning algorithm configured by the base station may be trained to reliably and accurately identify humans in the CSI video and/or to detect the position and/or movement of humans in the CSI video. In this way, the base station may schedule uplink and/or downlink transmissions to avoid beam transmissions in a direction toward the human(s) present in the environment surrounding the UE and/or to reduce the power associated with one or more beams that are transmitted toward the human(s) present in the environment surrounding the UE.

Additionally, or alternatively, the base station may be configured to implement any other suitable VCSI use case based on the information included in the VCSI report. For example, as described above, the VCSI report may include unstructured bits that are derived by the UE using the machine learning model configured by the base station. Accordingly, in some aspects, the base station may use a matching machine learning model to derive CSI from the unstructured bits included in the VCSI report, where the CSI may include any suitable parameters that describe how a wireless signal is expected to propagate in a wireless environment depicted in the CSI video. In this way, the base station may use the CSI that is derived from the unstructured bits for uplink and/or downlink scheduling, positioning, determining a measurement configuration of the UE, generating a handover or mobility decision for the UE, making a traffic prediction, load balancing, and/or energy saving, among other examples.

In some aspects, as described above with reference to FIG. 5A, a VCSI configuration may be implemented using RRC messages to support VCSI reporting on a PUCCH or PUSCH. However, in some cases, a legacy UE that supports video capture and machine learning techniques may lack support for an RRC framework that uses the RRC messages to support VCSI configuration and reporting. Accordingly, in some aspects, FIG. 5B illustrates an example 560 of an OTT solution to support UE-based VCSI for a legacy UE that may lack support for an RRC framework that uses the RRC messages to support VCSI configuration and reporting despite having suitable capabilities (e.g., video capture and application of machine learning) to capture CSI video and/or abstract CSI video into VCSI measurements. For example, as shown in FIG. 5B, a UE may download an application (shown as UE App) associated with an OTT service, and the application may communicate with a base station via an application server. For example, as shown by reference number 565, the application server may transmit the VCSI configuration to the application downloaded to the UE, where the VCSI configuration may be based on a VCSI that the base station provides to the application server. In general, the VCSI configuration may include similar information as described above with reference to FIG. 5A (e.g., CSI video capture parameters and/or a machine learning model identifier, among other examples).

Accordingly, in the OTT solution, the application downloaded to the UE may use the camera of the UE to perform CSI video capture based on the VCSI configuration received from the application server, and the UE application may abstract the captured CSI video into VCSI measurements using the machine learning model configured by the application server. As further shown by reference number 570, the application server may then deliver the VCSI measurements to the base station. For example, in some aspects, the application server may deliver the VCSI measurements to the base station via a RAN intelligent controller (RIC) via an A1 or E2 interface, via a core network using an NG interface, and/or via an application program interface associated with a RAN that includes the base station. As further shown by reference number 575, the base station may then derive CSI from the VCSI measurements and use the CSI to implement any suitable VCSI use case (e.g., uplink and/or downlink scheduling, positioning, determining a measurement configuration of the UE, generating a handover or mobility decision for the UE, traffic prediction, load balancing, and/or energy saving, among other examples).

As indicated above, FIGS. 5A-5B are provided as examples. Other examples may differ from what is described with regard to FIGS. 5A-5B.

Figure 6:
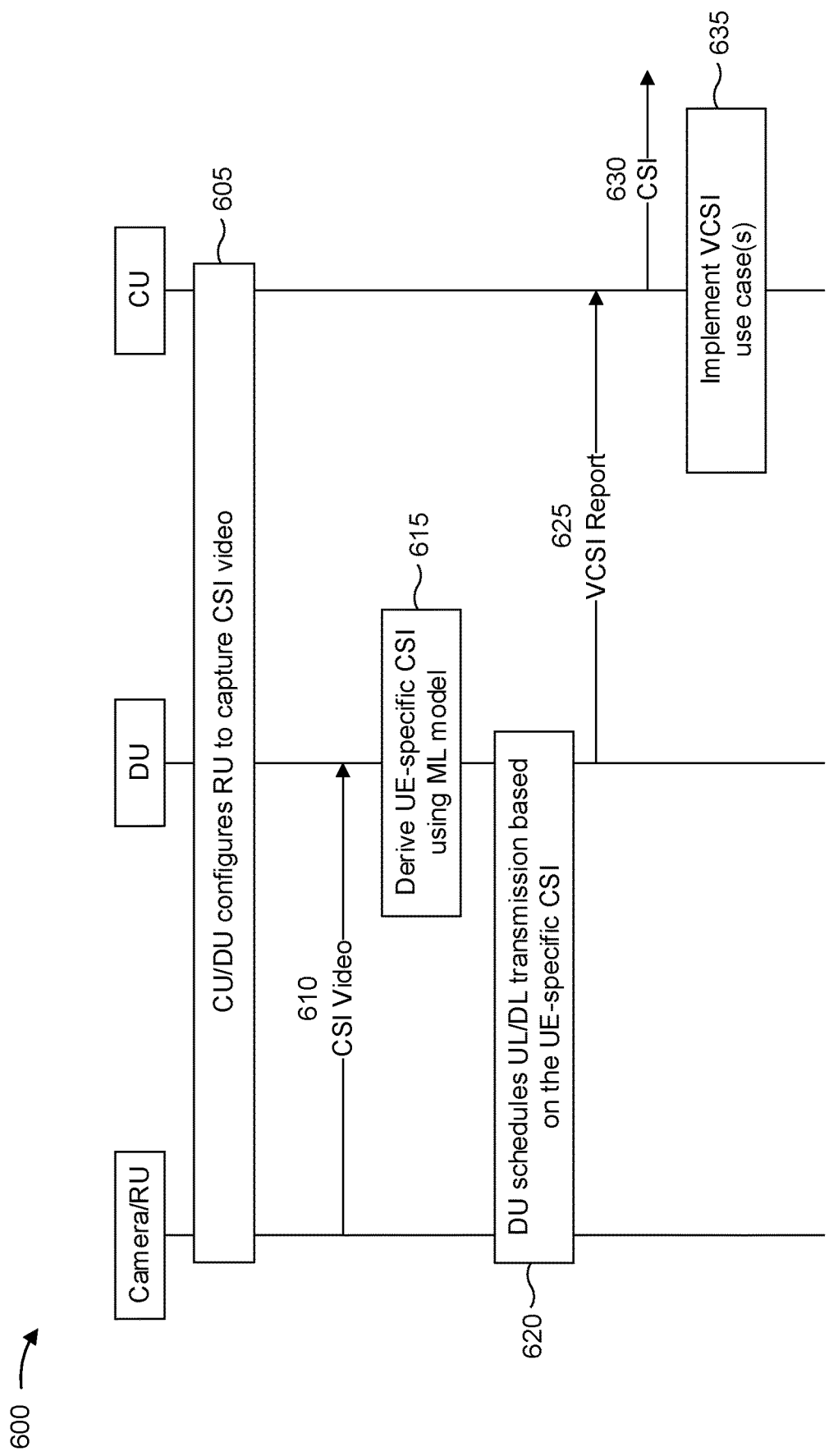
FIG. 6 is a diagram illustrating an example associated with network-based VCSI, in accordance with the present disclosure.

FIG. 6 is a diagram illustrating an example 600 associated with network-based VCSI, in accordance with the present disclosure. As shown in FIG. 6, example 600 includes communication between various components of a base station in a distributed RAN. For example, as shown, example 600 includes communication between a central unit (CU) of a base station, a distributed unit (DU) of the base station, and a radio unit (RU) of the base station. In some aspects, the CU, the DU, and the RU may communicate to enable network-based VCSI via a fronthaul link, which may include an F1-C interface for carrying control plane data and an F1-U interface for carrying user plane data. Furthermore, in some aspects, the RU may control or otherwise communicate with one or more antennas via a fronthaul interface. In some aspects, the network-based VCSI techniques described herein may performed independently and/or in combination with UE-based VCSI techniques described in further detail elsewhere herein (e.g., with reference to FIGS. 5A-5B).

As shown in FIG. 6, and by reference number 605, the CU and/or the DU may configure the RU to capture CSI video. For example, as described above, the RU may control or otherwise communicate with one or more antennas, and one or more cameras may be installed at the RU and/or the one or more antennas (e.g., one or more cameras may be deployed per beam, per TRP, and/or per antenna element group, among other examples). In some aspects, the RU may be configured to capture the CSI video using camera control signaling that is delivered from the CU or the DU to the RU via the fronthaul interface. For example, in some aspects, the camera control signaling may include identifiers of one or more camera lenses to be used to capture CSI video, a camera focus parameter, a camera zoom level, a camera exposure level, a direction or beam identifier for the CSI video, a camera activation time, a camera deactivation time, and/or any periodic activation and/or deactivation parameters, among other examples.

In some aspects, as further shown in FIG. 6, and by reference number 610, the RU may perform CSI video capture based on the configuration provided by the CU and/or the DU, and the RU may deliver the captured CSI video to the DU. For example, in some aspects, the RU may deliver the captured CSI video to the DU via a wired (e.g., fiber) fronthaul interface that has a high bandwidth, in which case the captured CSI video may be delivered to the DU in an uncompressed form. Alternatively, in cases where the fronthaul interface between the RU and the DU is bandwidth-limited, the RU may compress the CSI video using a machine learning model and may deliver the compressed CSI video to the DU via the fronthaul interface. In this case, the DU may decompress the CSI video using a machine learning model matched to the machine learning model used to compress the CSI video at the RU.

As further shown in FIG. 6, and by reference number 615, the DU may process the compressed or uncompressed CSI video using a machine learning model to abstract the CSI video into UE-specific CSI (e.g., CSI that relates to a wireless channel between the RU and a specific UE). For example, in some aspects, the machine learning model may include a neural network (e.g., a convolutional neural network) that can implement a computer vision technique to detect and classify one or more objects depicted in the CSI video and/or movement characteristics associated with one or more objects depicted in the CSI video. For example, in some aspects, the machine learning model may be trained to compress and/or abstract CSI video using an image recognition technique (e.g., an Inception framework, a ResNet framework, and/or a VGG framework), an object detection technique (e.g., an SSD or YOLO framework), an edge detection technique, and/or an object-in-motion technique (e.g., an optical flow framework), among other examples. For example, in some aspects, the machine learning model may be used to derive CSI that indicates whether one or more human and/or non-human objects are detected in the CSI video, a position, direction, and/or rate of movement of one or more objects detected in the CSI video, and/or a position, direction, and/or rate of movement of the UE, among other examples.

As further shown in FIG. 6, and by reference number 620, the DU and the RU may use the UE-specific CSI to adjust scheduling parameters for one or more uplink transmissions from a UE and/or one or more downlink transmissions to the UE. For example, in cases where the UE-specific CSI measurements indicate that one or more humans are present in the environment surrounding the UE, the DU and the RU may implement one or more mitigation actions such that uplink and/or downlink transmissions are not directed toward the human(s) at a high power (e.g., to avoid human health risks that may be caused by transmitted high frequency millimeter wave signals directly toward a human using a high-power beam). For example, in some aspects, the machine learning algorithm configured by the base station may be trained to reliably and accurately identify humans in the CSI video and/or to detect the position and/or movement of humans in the CSI video such that uplink and/or downlink transmissions can be scheduled to avoid beam transmissions in a direction toward the human(s) present in the environment surrounding the UE and/or to reduce the power associated with one or more beams that are transmitted toward the human(s) present in the environment surrounding the UE.

As further shown in FIG. 6, and by reference number 625, the DU may provide, to the CU, a VCSI report that includes the UE-specific CSI and/or other CSI measurements abstracted from CSI video captured by the RU and/or one or more UEs. As further shown by reference number 630, the CU may report the UE-specific CSI and/or other CSI measurements abstracted from CSI video to a core network entity for positioning (e.g., to a location management function (LMF) that can determine the position and/or movement of one or more objects depicted in the CSI video and/or one or more devices communicating in a wireless environment depicted in the CSI video). As further shown in FIG. 6, and by reference number 635, the CU may implement any suitable VCSI use case based on the VCSI report and/or positioning results received from the core network entity. For example, the CU may use CSI that is derived from the compressed or uncompressed CSI video for uplink and/or downlink scheduling, positioning, determining a measurement configuration of one or more UEs, generating a handover or mobility decision for one or more UEs, making a traffic prediction, load balancing, and/or energy saving, among other examples.

As indicated above, FIG. 6 is provided as an example. Other examples may differ from what is described with regard to FIG. 6.

Figure 7:
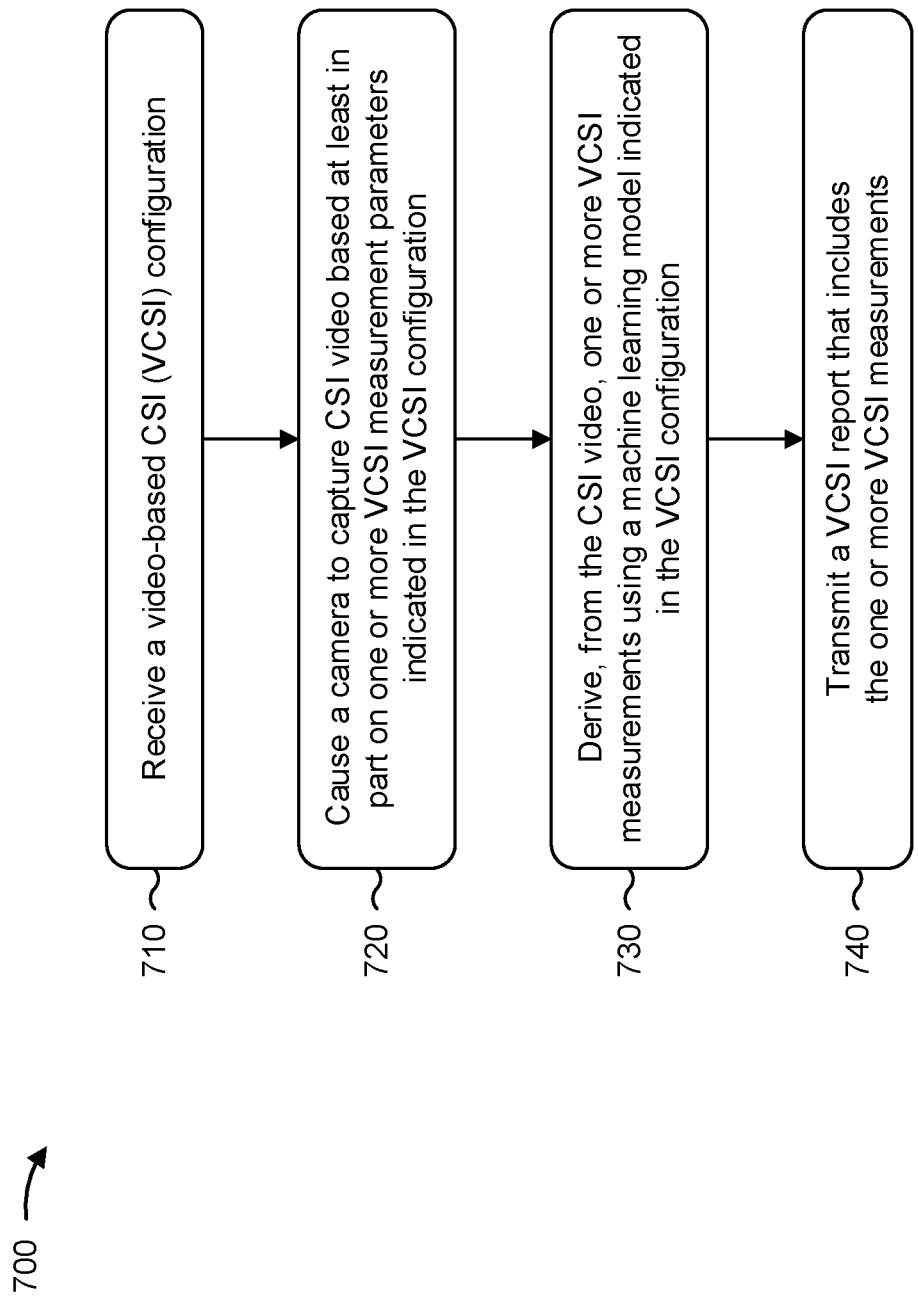
FIGS. 7-9 are diagrams illustrating example processes associated with VCSI, in accordance with the present disclosure.

FIG. 7 is a diagram illustrating an example process 700 performed, for example, by a UE, in accordance with the present disclosure. Example process 700 is an example where the UE (e.g., UE 120) performs operations associated with VCSI.

As shown in FIG. 7, in some aspects, process 700 may include receiving a VCSI configuration (block 710). For example, the UE (e.g., using communication manager 140 and/or reception component 1002, depicted in FIG. 10) may receive a VCSI configuration, as described above.

As further shown in FIG. 7, in some aspects, process 700 may include causing a camera to capture CSI video based at least in part on one or more VCSI measurement parameters indicated in the VCSI configuration (block 720). For example, the UE (e.g., using communication manager 140 and/or VCSI component 1008, depicted in FIG. 10) may cause a camera to capture CSI video based at least in part on one or more VCSI measurement parameters indicated in the VCSI configuration, as described above.

As further shown in FIG. 7, in some aspects, process 700 may include deriving, from the CSI video, one or more VCSI measurements using a machine learning model indicated in the VCSI configuration (block 730). For example, the UE (e.g., using communication manager 140 and/or VCSI component 1008, depicted in FIG. 10) may derive, from the CSI video, one or more VCSI measurements using a machine learning model indicated in the VCSI configuration, as described above.

As further shown in FIG. 7, in some aspects, process 700 may include transmitting a VCSI report that includes the one or more VCSI measurements (block 740). For example, the UE (e.g., using communication manager 140 and/or transmission component 1004, depicted in FIG. 10) may transmit a VCSI report that includes the one or more VCSI measurements, as described above.

Process 700 may include additional aspects, such as any single aspect or any combination of aspects described below and/or in connection with one or more other processes described elsewhere herein.

In a first aspect, process 700 includes transmitting, to a base station, information that relates to a capability to capture the CSI video, where the VCSI configuration is received from the base station based at least in part on the capability to capture the CSI video.

In a second aspect, alone or in combination with the first aspect, the information that relates to the capability to capture the CSI video includes a number of lenses available to capture the CSI video, a power constraint associated with the camera, a capability to track a direction of the base station, or a capability to perform on-demand direction tuning.

In a third aspect, alone or in combination with one or more of the first and second aspects, the VCSI configuration is received at a modem, and causing the camera to capture the CSI video includes providing, from the modem to an application layer, a command that includes one or more camera control parameters associated with capturing the CSI video.

In a fourth aspect, alone or in combination with one or more of the first through third aspects, the one or more camera control parameters include one or more of a camera lens identifier, focus information, a beam identifier or beam direction, camera activation or deactivation timing information, or an address to which to upload the CSI video.

In a fifth aspect, alone or in combination with one or more of the first through fourth aspects, process 700 includes receiving, at the modem from the application layer, a message acknowledging the command that includes the one or more camera control parameters.

In a sixth aspect, alone or in combination with one or more of the first through fifth aspects, the VCSI report is transmitted to a base station via a PUCCH or a PUSCH.

In a seventh aspect, alone or in combination with one or more of the first through sixth aspects, the VCSI report is transmitted based at least in part on a triggering event or expiration of a periodic reporting interval.

In an eighth aspect, alone or in combination with one or more of the first through seventh aspects, the VCSI configuration is received from an application server, and the VCSI report is transmitted to the application server.

In a ninth aspect, alone or in combination with one or more of the first through eighth aspects, the one or more VCSI measurements include a beam identifier, one or more object detection bits that indicate whether humans or objects are present in the CSI video, and one or more unstructured bits that are derived using the machine learning model indicated in the VCSI configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
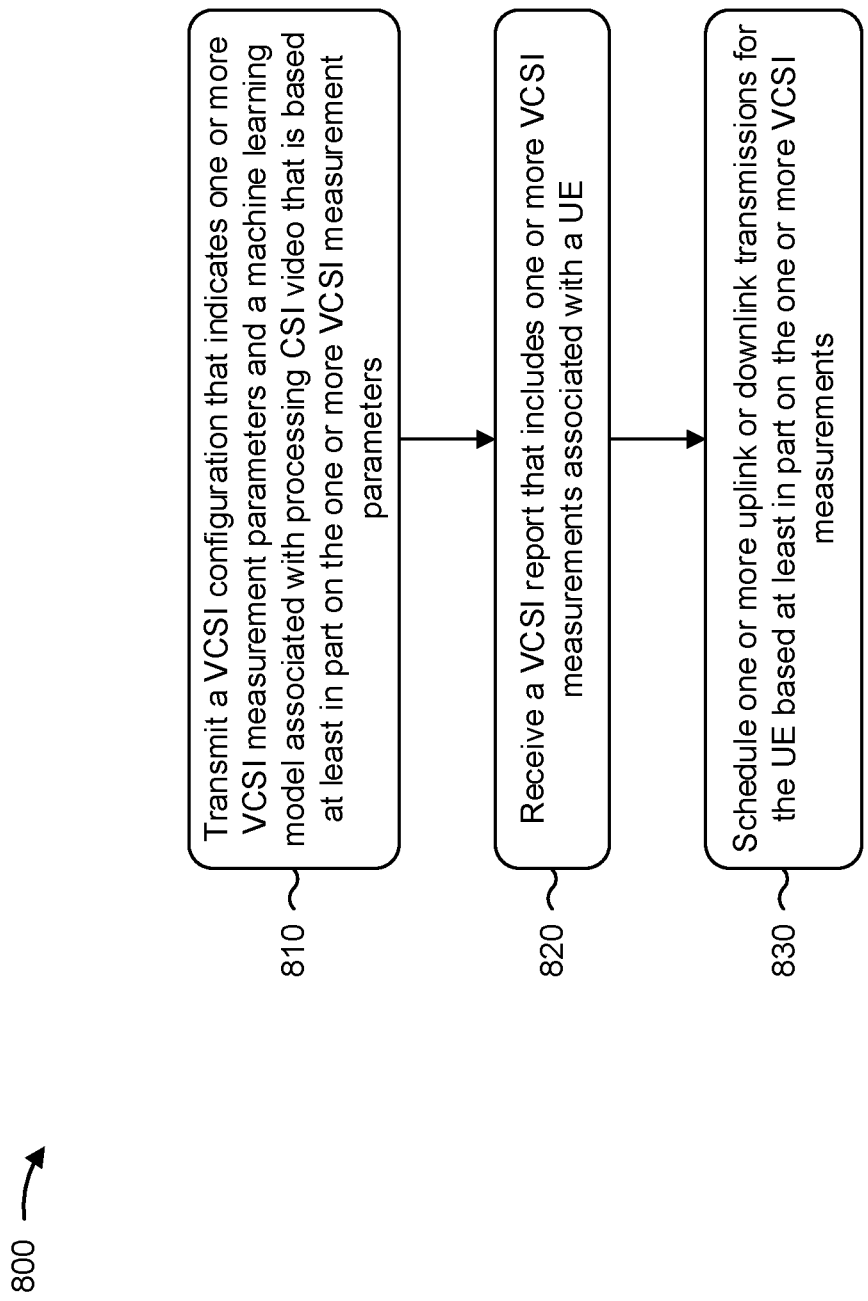

FIG. 8 is a diagram illustrating an example process 800 performed, for example, by a base station, in accordance with the present disclosure. Example process 800 is an example where the base station (e.g., base station 110) performs operations associated with video based CSI.

As shown in FIG. 8, in some aspects, process 800 may include transmitting a VCSI configuration that indicates one or more VCSI measurement parameters and a machine learning model associated with processing CSI video that is based at least in part on the one or more VCSI measurement parameters (block 810). For example, the base station (e.g., using communication manager 150 and/or transmission component 1104, depicted in FIG. 11) may transmit a VCSI configuration that indicates one or more VCSI measurement parameters and a machine learning model associated with processing CSI video that is based at least in part on the one or more VCSI measurement parameters, as described above.

As further shown in FIG. 8, in some aspects, process 800 may include receiving a VCSI report that includes one or more VCSI measurements associated with a UE (block 820). For example, the base station (e.g., using communication manager 150 and/or reception component 1102, depicted in FIG. 11) may receive a VCSI report that includes one or more VCSI measurements associated with a UE, as described above.

As further shown in FIG. 8, in some aspects, process 800 may include scheduling one or more uplink or downlink transmissions for the UE based at least in part on the one or more VCSI measurements (block 830). For example, the base station (e.g., using communication manager 150 and/or scheduling component 1108, depicted in FIG. 11) may schedule one or more uplink or downlink transmissions for the UE based at least in part on the one or more VCSI measurements, as described above.

Process 800 may include additional aspects, such as any single aspect or any combination of aspects described below and/or in connection with one or more other processes described elsewhere herein.

In a first aspect, process 800 includes receiving, from the UE, information that relates to a capability to capture the CSI video, where the VCSI configuration is transmitted to the UE based at least in part on the capability to capture the CSI video.

In a second aspect, alone or in combination with the first aspect, the information that relates to the capability to capture the CSI video includes a number of lenses available to capture the CSI video, a power constraint associated with a camera, a capability to track a direction of the base station, or a capability to perform on-demand direction tuning.

In a third aspect, alone or in combination with one or more of the first and second aspects, the VCSI report is received via a PUCCH or a PUSCH.

In a fourth aspect, alone or in combination with one or more of the first through third aspects, the VCSI report is received based at least in part on a triggering event or expiration of a periodic reporting interval.

In a fifth aspect, alone or in combination with one or more of the first through fourth aspects, the VCSI configuration is transmitted to an application server associated with the UE, and the VCSI report is received from the application server.

In a sixth aspect, alone or in combination with one or more of the first through fifth aspects, the one or more VCSI measurements include a beam identifier, one or more object detection bits that indicate whether humans or objects are present in the CSI video, and one or more unstructured bits that are derived using the machine learning model indicated in the VCSI configuration.

In a seventh aspect, alone or in combination with one or more of the first through sixth aspects, process 800 includes deriving CSI from the one or more unstructured bits using the machine learning model.

In an eighth aspect, alone or in combination with one or more of the first through seventh aspects, process 800 includes determining that the one or more object detection bits indicate that one or more humans are present in the CSI video, and configuring one or more mitigation actions to avoid transmitting a high-power beam directly toward the one or more humans.

In a ninth aspect, alone or in combination with one or more of the first through eighth aspects, process 800 includes using the one or more VCSI measurements for one or more of positioning, a measurement configuration for the UE, a mobility decision for the UE, traffic prediction, load balancing, or energy saving.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
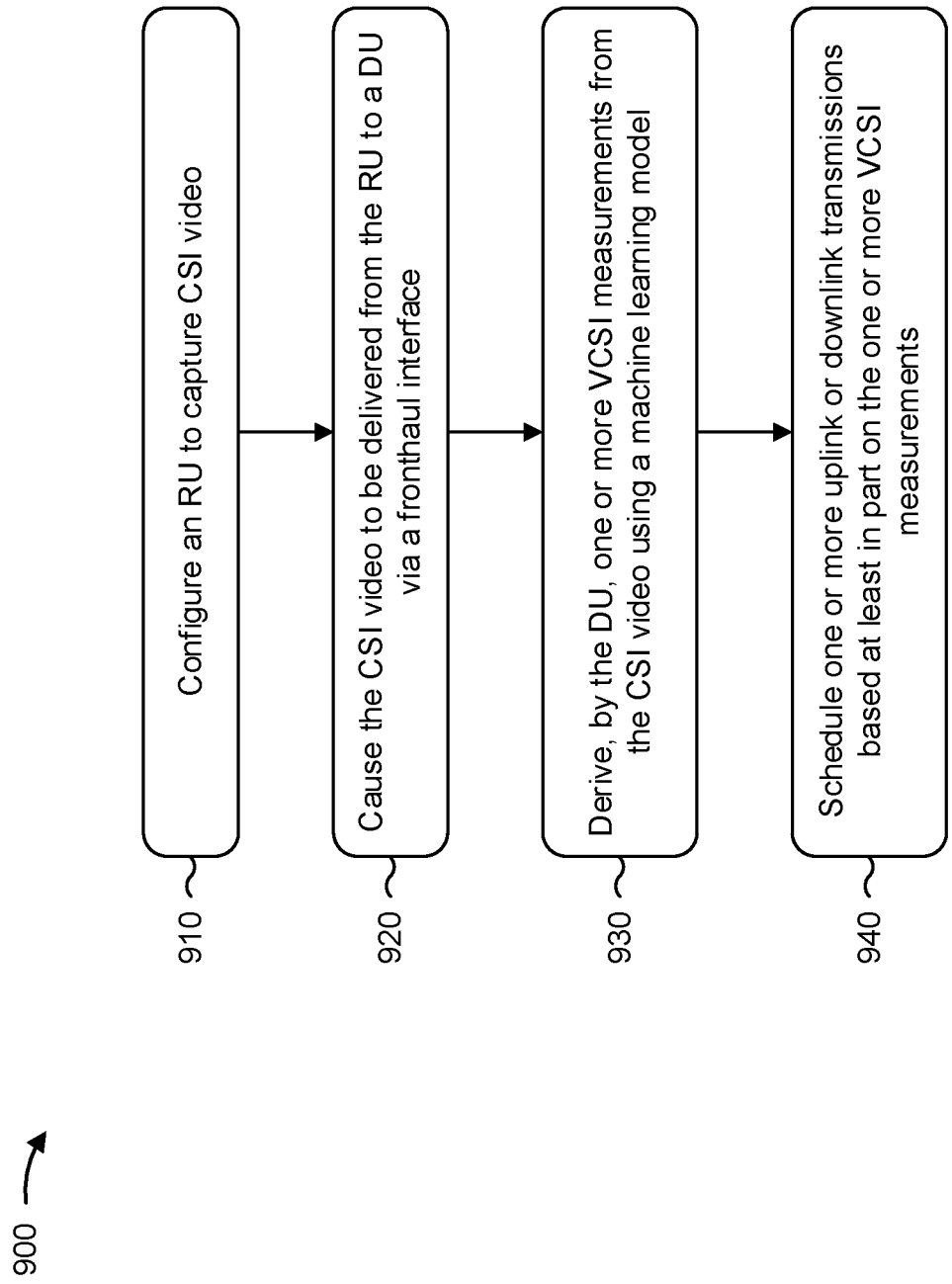

FIG. 9 is a diagram illustrating an example process 900 performed, for example, by a base station, in accordance with the present disclosure. Example process 900 is an example where the base station (e.g., base station 110) performs operations associated with video based CSI.

As shown in FIG. 9, in some aspects, process 900 may include configuring an RU to capture CSI video (block 910). For example, the base station (e.g., using communication manager 150 and/or configuration component 1208, depicted in FIG. 12) may configure an RU to capture CSI video, as described above.

As further shown in FIG. 9, in some aspects, process 900 may include causing the CSI video to be delivered from the RU to a DU via a fronthaul interface (block 920). For example, the base station (e.g., using communication manager 150, transmission component 1204, and/or reception component 1202, depicted in FIG. 12) may cause the CSI video to be delivered from the RU to a DU via a fronthaul interface, as described above.

As further shown in FIG. 9, in some aspects, process 900 may include deriving one or more VCSI measurements from the CSI video using a machine learning model (block 930). For example, the base station (e.g., using communication manager 150 and/or VCSI component 1210, depicted in FIG. 12) may derive one or more VCSI measurements from the CSI video using a machine learning model, as described above.

As further shown in FIG. 9, in some aspects, process 900 may include scheduling one or more uplink or downlink transmissions based at least in part on the one or more VCSI measurements (block 940). For example, the base station (e.g., using communication manager 150 and/or scheduling component 1212, depicted in FIG. 12) may schedule one or more uplink or downlink transmissions based at least in part on the one or more VCSI measurements, as described above.

Process 900 may include additional aspects, such as any single aspect or any combination of aspects described below and/or in connection with one or more other processes described elsewhere herein.

In a first aspect, the CSI video delivered to the DU is uncompressed.

In a second aspect, alone or in combination with the first aspect, the CSI video delivered to the DU is compressed using the machine learning model.

In a third aspect, alone or in combination with one or more of the first and second aspects, configuring the RU to capture the CSI video includes carrying, over the fronthaul interface, camera control signaling that includes one or more parameters to capture the CSI video using a camera associated with the RU.

In a fourth aspect, alone or in combination with one or more of the first through third aspects, the one or more parameters include one or more of a camera lens identifier, focus information, a beam identifier or beam direction, camera activation or deactivation timing information, or an address to which to upload the CSI video.

In a fifth aspect, alone or in combination with one or more of the first through fourth aspects, the one or more VCSI measurements include one or more object detection bits that indicate whether humans or objects are present in the CSI video.

In a sixth aspect, alone or in combination with one or more of the first through fifth aspects, process 900 includes determining that the one or more object detection bits indicate that one or more humans are present in the CSI video, and configuring one or more mitigation actions to avoid transmitting a high-power beam directly toward the one or more humans.

In a seventh aspect, alone or in combination with one or more of the first through sixth aspects, the one or more mitigation actions include configuring one or more beams to avoid transmission toward the one or more humans.

In an eighth aspect, alone or in combination with one or more of the first through seventh aspects, the one or more mitigation actions include reducing a power associated with one or more beams that are transmitted toward the one or more humans.

In a ninth aspect, alone or in combination with one or more of the first through eighth aspects, process 900 includes reporting the one or more VCSI measurements to a CU for one or more of positioning, a measurement configuration for the UE, a mobility decision for the UE, traffic prediction, load balancing, or energy saving.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
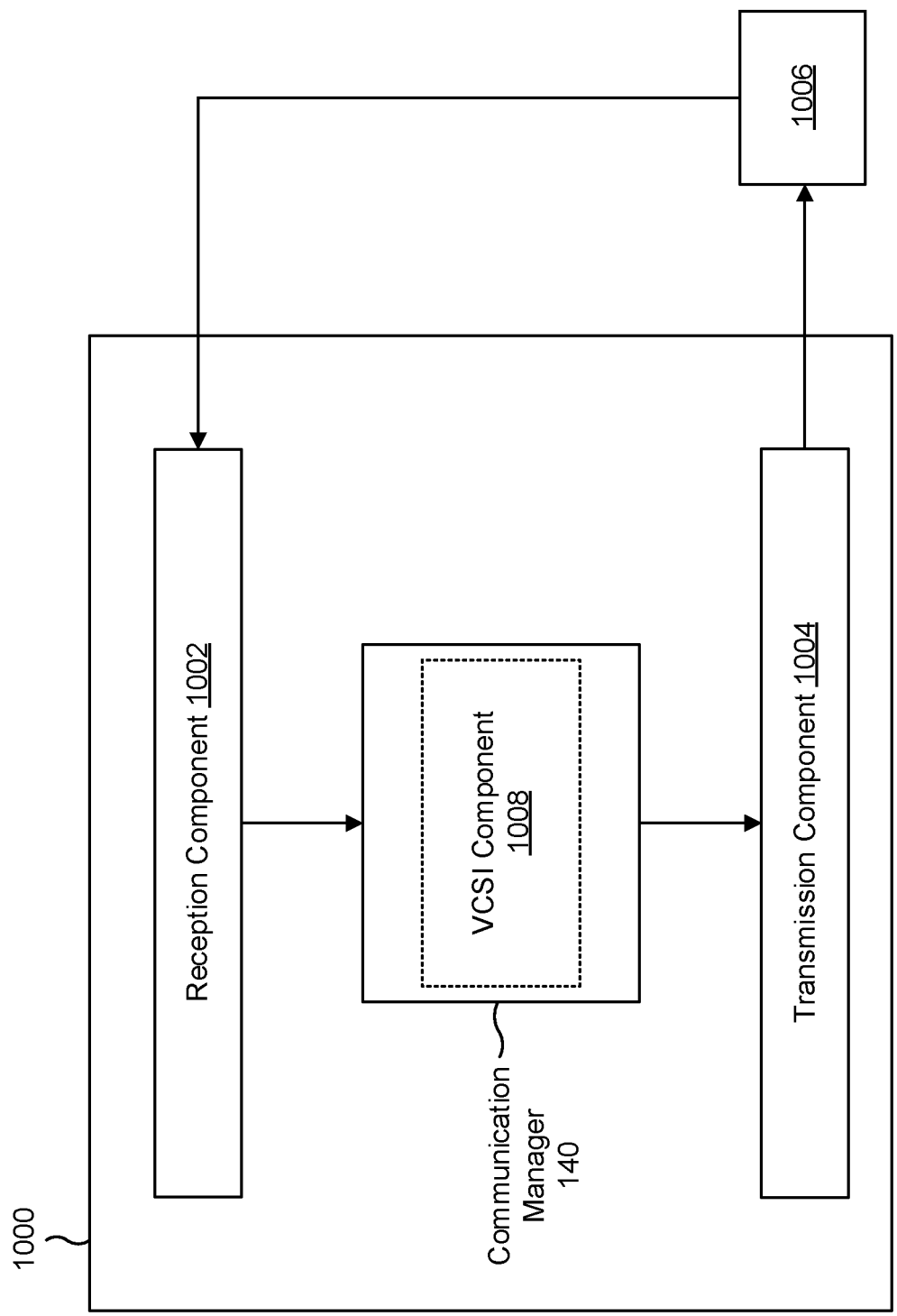
FIGS. 10-12 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a VCSI component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 700 of FIG. 7. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a VCSI configuration. The VCSI component 1008 may cause a camera to capture CSI video based at least in part on one or more VCSI measurement parameters indicated in the VCSI configuration. The VCSI component 1008 may derive, from the CSI video, one or more VCSI measurements using a machine learning model indicated in the VCSI configuration. The transmission component 1004 may transmit a VCSI report that includes the one or more VCSI measurements.

The transmission component 1004 may transmit, to a base station, information that relates to a capability to capture the CSI video, wherein the VCSI configuration is received from the base station based at least in part on the capability to capture the CSI video.

The reception component 1002 may receive, at the modem from the application layer, a message acknowledging the command that includes the one or more camera control parameters.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
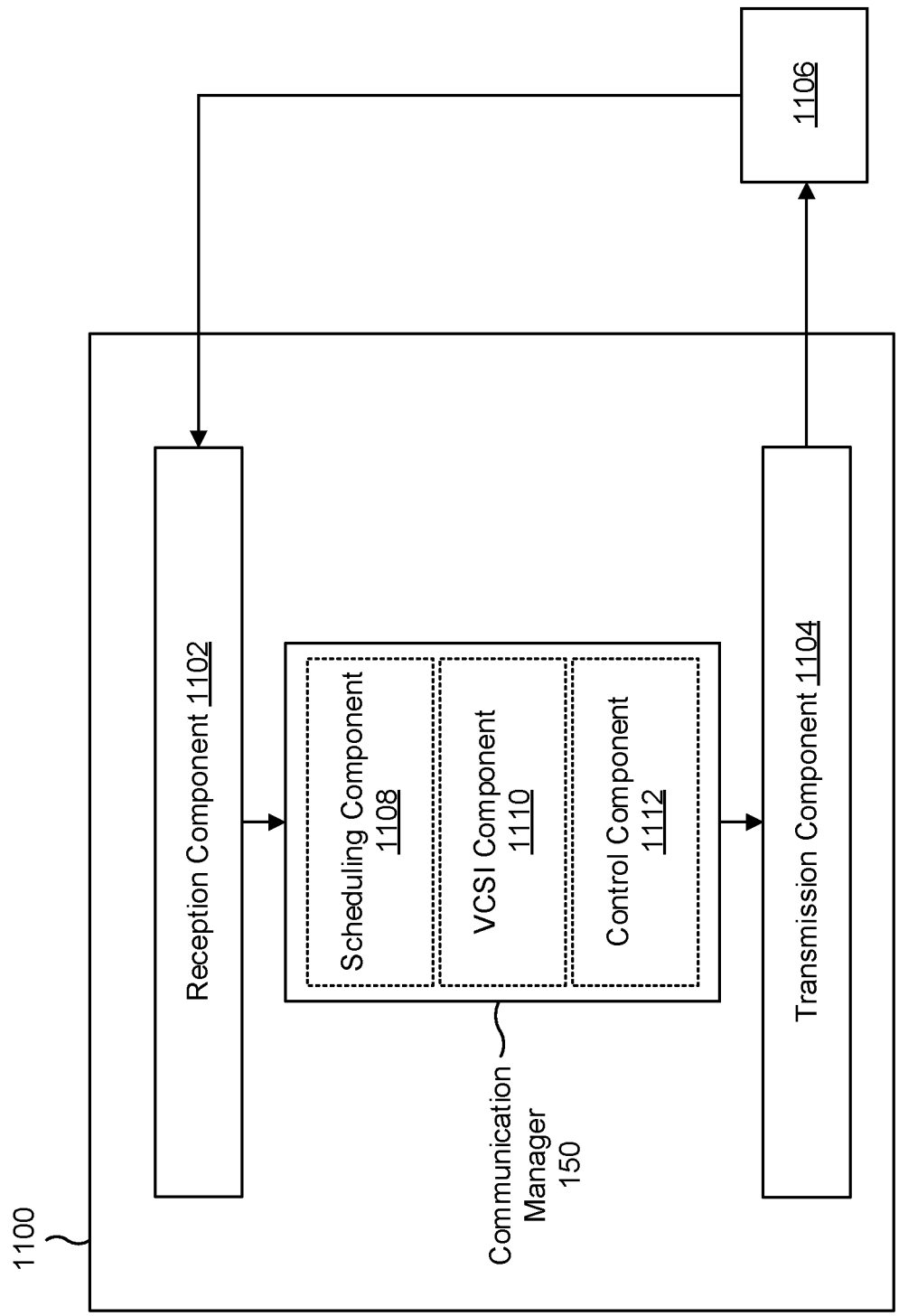

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of a scheduling component 1108, a VCSI component 1110, or a control component 1112, among other examples.

In some aspects, the apparatus 1100 may be configured to perform one or more operations described herein in connection with FIGS. 4-6. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit a VCSI configuration that indicates one or more VCSI measurement parameters and a machine learning model associated with processing CSI video that is based at least in part on the one or more VCSI measurement parameters. The reception component 1102 may receive a VCSI report that includes one or more VCSI measurements associated with a UE. The scheduling component 1108 may schedule one or more uplink or downlink transmissions for the UE based at least in part on the one or more VCSI measurements.

The reception component 1102 may receive, from the UE, information that relates to a capability to capture the CSI video, wherein the VCSI configuration is transmitted to the UE based at least in part on the capability to capture the CSI video.

The VCSI component 1110 may derive CSI from the one or more unstructured bits using the machine learning model.

The VCSI component 1110 may determine that the one or more object detection bits indicate that one or more humans are present in the CSI video. The control component 1112 may configure one or more mitigation actions to avoid transmitting a high-power beam directly toward the one or more humans.

The control component 1112 may use the one or more VCSI measurements for one or more of positioning, a measurement configuration for the UE, a mobility decision for the UE, traffic prediction, load balancing, or energy saving.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
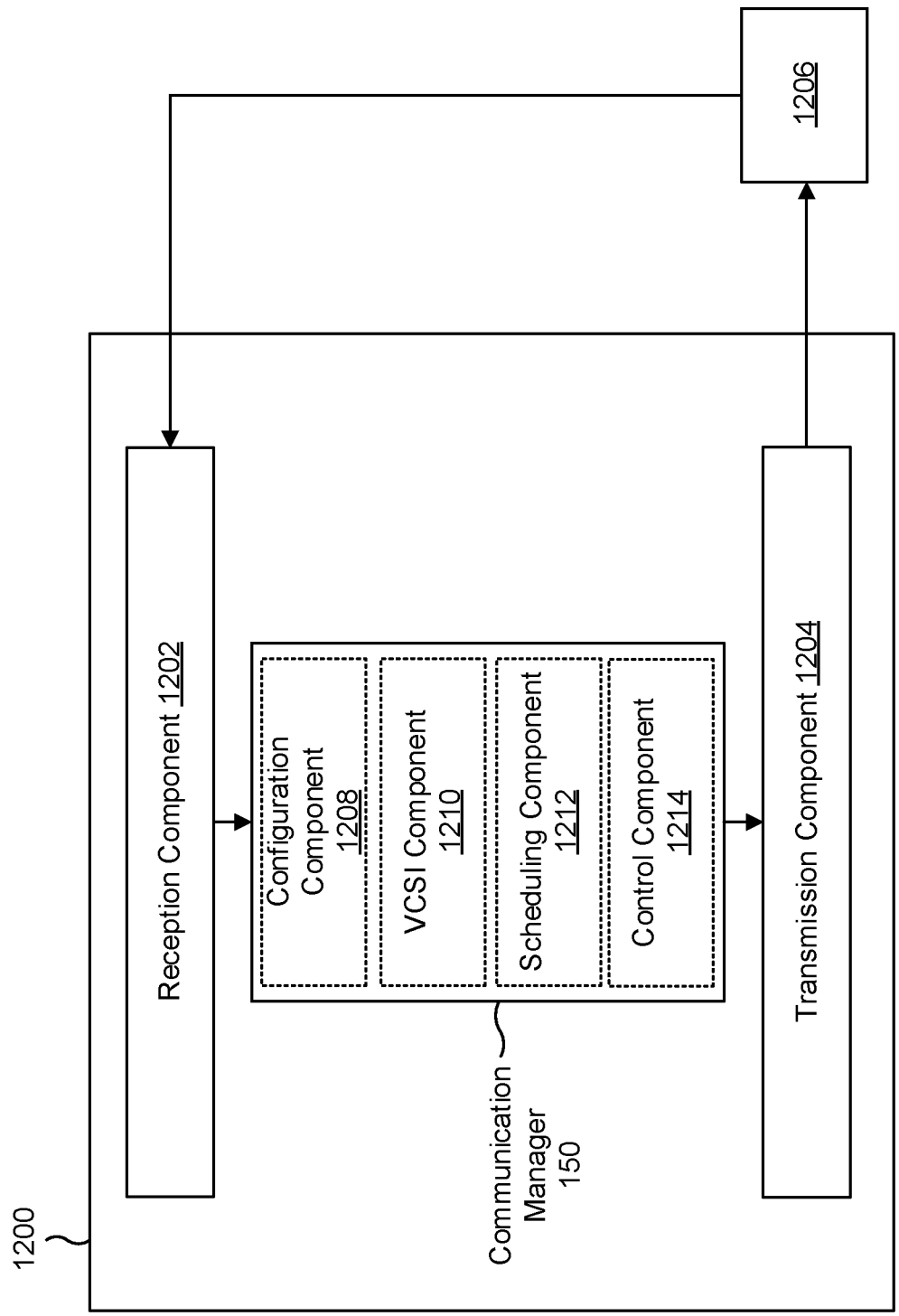

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a configuration component 1208, a VCSI component 1210, a scheduling component 1212, or a control component 1214, among other examples.

In some aspects, the apparatus 1200 may be configured to perform one or more operations described herein in connection with FIGS. 4-6. Additionally, or alternatively, the apparatus 1200 may be configured to perform one or more processes described herein, such as process 800 of FIG. 8, process 900 of FIG. 9, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The configuration component 1208 may configure an RU to capture CSI video. The VCSI component 1210 may cause the CSI video to be delivered from the RU to a DU via a fronthaul interface. The VCSI component 1210 may derive one or more VCSI measurements from the CSI video using a machine learning model. The scheduling component 1212 may schedule one or more uplink or downlink transmissions based at least in part on the one or more VCSI measurements.

The VCSI component 1210 may determine that the one or more object detection bits indicate that one or more humans are present in the CSI video. The control component 1214 may configure one or more mitigation actions to avoid transmitting a high-power beam directly toward the one or more humans.

The control component 1214 may report the one or more VCSI measurements to a CU for one or more of positioning, a measurement configuration for the UE, a mobility decision for the UE, traffic prediction, load balancing, or energy saving.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving a VCSI configuration; causing a camera to capture CSI video based at least in part on one or more VCSI measurement parameters indicated in the VCSI configuration; deriving, from the CSI video, one or more VCSI measurements using a machine learning model indicated in the VCSI configuration; and transmitting a VCSI report that includes the one or more VCSI measurements.

Aspect 2: The method of Aspect 1, further comprising: transmitting, to a base station, information that relates to a capability to capture the CSI video, wherein the VCSI configuration is received from the base station based at least in part on the capability to capture the CSI video.

Aspect 3: The method of Aspect 2, wherein the information that relates to the capability to capture the CSI video includes a number of lenses available to capture the CSI video, a power constraint associated with the camera, a capability to track a direction of the base station, or a capability to perform on-demand direction tuning.

Aspect 4: The method of any of Aspects 1-3, wherein the VCSI configuration is received at a modem, and wherein causing the camera to capture the CSI video includes: providing, from the modem to an application layer, a command that includes one or more camera control parameters associated with capturing the CSI video.

Aspect 5: The method of Aspect 4, wherein the one or more camera control parameters include one or more of a camera lens identifier, focus information, a beam identifier or beam direction, camera activation or deactivation timing information, or an address to which to upload the CSI video.

Aspect 6: The method of any of Aspects 4-5, further comprising: receiving, at the modem from the application layer, a message acknowledging the command that includes the one or more camera control parameters.

Aspect 7: The method of any of Aspects 1-6, wherein the VCSI report is transmitted to a base station via a PUCCH or a PUSCH.

Aspect 8: The method of any of Aspects 1-7, wherein the VCSI report is transmitted based at least in part on a triggering event or expiration of a periodic reporting interval.

Aspect 9: The method of any of Aspects 1-6, wherein the VCSI configuration is received from an application server, and wherein the VCSI report is transmitted to the application server.

Aspect 10: The method of any of Aspects 1-9, wherein the one or more VCSI measurements include a beam identifier, one or more object detection bits that indicate whether humans or objects are present in the CSI video, and one or more unstructured bits that are derived using the machine learning model indicated in the VCSI configuration.

Aspect 11: A method of wireless communication performed by a base station, comprising: transmitting a VCSI configuration that indicates one or more VCSI measurement parameters and a machine learning model associated with processing CSI video that is based at least in part on the one or more VCSI measurement parameters; receiving a VCSI report that includes one or more VCSI measurements associated with a UE; and scheduling one or more uplink or downlink transmissions for the UE based at least in part on the one or more VCSI measurements.

Aspect 12: The method of Aspect 11, further comprising: receiving, from the UE, information that relates to a capability to capture the CSI video, wherein the VCSI configuration is transmitted to the UE based at least in part on the capability to capture the CSI video.

Aspect 13: The method of Aspect 12, wherein the information that relates to the capability to capture the CSI video includes a number of lenses available to capture the CSI video, a power constraint associated with a camera, a capability to track a direction of the base station, or a capability to perform on-demand direction tuning.

Aspect 14: The method of any of Aspects 11-13, wherein the VCSI report is received via a PUCCH or a PUSCH.

Aspect 15: The method of Aspect 14, wherein the VCSI report is received based at least in part on a triggering event or expiration of a periodic reporting interval.

Aspect 16: The method of any of Aspects 11-13, wherein the VCSI configuration is transmitted to an application server associated with the UE, and wherein the VCSI report is received from the application server.

Aspect 17: The method of any of Aspects 11-16, wherein the one or more VCSI measurements include a beam identifier, one or more object detection bits that indicate whether humans or objects are present in the CSI video, and one or more unstructured bits that are derived using the machine learning model indicated in the VCSI configuration.

Aspect 18: The method of Aspect 17, further comprising: deriving CSI from the one or more unstructured bits using the machine learning model.

Aspect 19: The method of any of Aspects 17-18, further comprising: determining that the one or more object detection bits indicate that one or more humans are present in the CSI video; and configuring one or more mitigation actions to avoid transmitting a high-power beam directly toward the one or more humans.

Aspect 20: The method of any of Aspects 11-19, further comprising: using the one or more VCSI measurements for one or more of positioning, a measurement configuration for the UE, a mobility decision for the UE, traffic prediction, load balancing, or energy saving.

Aspect 21: A method of wireless communication performed by a base station, comprising: configuring an RU to capture CSI video; causing the CSI video to be delivered from the RU to a DU via a fronthaul interface; deriving, by the DU, one or more VCSI measurements from the CSI video using a machine learning model; and scheduling one or more uplink or downlink transmissions based at least in part on the one or more VCSI measurements.

Aspect 22: The method of Aspect 21, wherein the CSI video delivered to the DU is uncompressed.

Aspect 23: The method of Aspect 21, wherein the CSI video delivered to the DU is compressed using the machine learning model.

Aspect 24: The method of any of Aspects 21-23, wherein configuring the RU to capture the CSI video includes: carrying, over the fronthaul interface, camera control signaling that includes one or more parameters to capture the CSI video using a camera associated with the RU.

Aspect 25: The method of Aspect 24, wherein the one or more parameters include one or more of a camera lens identifier, focus information, a beam identifier or beam direction, camera activation or deactivation timing information, or an address to which to upload the CSI video.

Aspect 26: The method of any of Aspects 21-26, wherein the one or more VCSI measurements include one or more object detection bits that indicate whether humans or objects are present in the CSI video.

Aspect 27: The method of Aspect 26, further comprising: determining that the one or more object detection bits indicate that one or more humans are present in the CSI video; and configuring one or more mitigation actions to avoid transmitting a high-power beam directly toward the one or more humans.

Aspect 28: The method of Aspect 27, wherein the one or more mitigation actions include configuring one or more beams to avoid transmission toward the one or more humans.

Aspect 29: The method of any of Aspects 27-28, wherein the one or more mitigation actions include reducing a power associated with one or more beams that are transmitted toward the one or more humans.

Aspect 30: The method of any of Aspects 21-29, further comprising: reporting the one or more VCSI measurements to a CU for one or more of positioning, a measurement configuration for the UE, a mobility decision for the UE, traffic prediction, load balancing, or energy saving.

Aspect 31: An apparatus for wireless communication at a device, comprising a processor; memory coupled with the processor; and instructions stored in the memory and executable by the processor to cause the apparatus to perform the method of one or more of Aspects 1-10.

Aspect 32: A device for wireless communication, comprising a memory and one or more processors coupled to the memory, the one or more processors configured to perform the method of one or more of Aspects 1-10.

Aspect 33: An apparatus for wireless communication, comprising at least one means for performing the method of one or more of Aspects 1-10.

Aspect 34: A non-transitory computer-readable medium storing code for wireless communication, the code comprising instructions executable by a processor to perform the method of one or more of Aspects 1-10.

Aspect 35: A non-transitory computer-readable medium storing a set of instructions for wireless communication, the set of instructions comprising one or more instructions that, when executed by one or more processors of a device, cause the device to perform the method of one or more of Aspects 1-10.

Aspect 36: An apparatus for wireless communication at a device, comprising a processor; memory coupled with the processor; and instructions stored in the memory and executable by the processor to cause the apparatus to perform the method of one or more of Aspects 11-20.

Aspect 37: A device for wireless communication, comprising a memory and one or more processors coupled to the memory, the one or more processors configured to perform the method of one or more of Aspects 11-20.

Aspect 38: An apparatus for wireless communication, comprising at least one means for performing the method of one or more of Aspects 11-20.

Aspect 39: A non-transitory computer-readable medium storing code for wireless communication, the code comprising instructions executable by a processor to perform the method of one or more of Aspects 11-20.

Aspect 40: A non-transitory computer-readable medium storing a set of instructions for wireless communication, the set of instructions comprising one or more instructions that, when executed by one or more processors of a device, cause the device to perform the method of one or more of Aspects 11-20.

Aspect 41: An apparatus for wireless communication at a device, comprising a processor; memory coupled with the processor; and instructions stored in the memory and executable by the processor to cause the apparatus to perform the method of one or more of Aspects 21-30.

Aspect 42: A device for wireless communication, comprising a memory and one or more processors coupled to the memory, the one or more processors configured to perform the method of one or more of Aspects 21-30.

Aspect 43: An apparatus for wireless communication, comprising at least one means for performing the method of one or more of Aspects 21-30.

Aspect 44: A non-transitory computer-readable medium storing code for wireless communication, the code comprising instructions executable by a processor to perform the method of one or more of Aspects 21-30.

Aspect 45: A non-transitory computer-readable medium storing a set of instructions for wireless communication, the set of instructions comprising one or more instructions that, when executed by one or more processors of a device, cause the device to perform the method of one or more of Aspects 21-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a video-based channel state information (VCSI) configuration;
   causing a camera to capture channel state information (CSI) video based at least in part on one or more VCSI measurement parameters indicated in the VCSI configuration;
   deriving, from the CSI video, one or more VCSI measurements using a machine learning model indicated in the VCSI configuration; and
   transmitting a VCSI report that includes the one or more VCSI measurements.

2. The method of claim 1, further comprising:
   transmitting, to a base station, information that relates to a capability to capture the CSI video, wherein the VCSI configuration is received from the base station based at least in part on the capability to capture the CSI video.

3. The method of claim 2, wherein the information that relates to the capability to capture the CSI video includes a number of lenses available to capture the CSI video, a power constraint associated with the camera, a capability to track a direction of the base station, or a capability to perform on-demand direction tuning.

4. The method of claim 1, wherein the VCSI configuration is received at a modem, and wherein causing the camera to capture the CSI video includes:
   providing, from the modem to an application layer, a command that includes one or more camera control parameters associated with capturing the CSI video.

5. The method of claim 4, wherein the one or more camera control parameters include one or more of a camera lens identifier, focus information, a beam identifier or beam direction, camera activation or deactivation timing information, or an address to which to upload the CSI video.

6. The method of claim 4, further comprising:
   receiving, at the modem from the application layer, a message acknowledging the command that includes the one or more camera control parameters.

7. The method of claim 1, wherein the VCSI report is transmitted to a base station via a physical uplink control channel or a physical uplink shared channel.

8. The method of claim 1, wherein the VCSI report is transmitted based at least in part on a triggering event or expiration of a periodic reporting interval.

9. The method of claim 1, wherein the VCSI configuration is received from an application server, and wherein the VCSI report is transmitted to the application server.

10. The method of claim 1, wherein the one or more VCSI measurements include a beam identifier, one or more object detection bits that indicate whether humans or objects are present in the CSI video, and one or more unstructured bits that are derived using the machine learning model indicated in the VCSI configuration.

11. A method of wireless communication performed by a base station, comprising:
    transmitting a video-based channel state information (VCSI) configuration that indicates one or more VCSI measurement parameters and a machine learning model associated with processing channel state information (CSI) video that is based at least in part on the one or more VCSI measurement parameters;

receiving a VCSI report that includes one or more VCSI measurements associated with a user equipment (UE); and scheduling one or more uplink or downlink transmissions for the UE based at least in part on the one or more VCSI measurements.

12. The method of claim 11, further comprising:

receiving, from the UE, information that relates to a capability to capture the CSI video, wherein the VCSI configuration is transmitted to the UE based at least in part on the capability to capture the CSI video.

13. The method of claim 12, wherein the information that relates to the capability to capture the CSI video includes a number of lenses available to capture the CSI video, a power constraint associated with a camera, a capability to track a direction of the base station, or a capability to perform on-demand direction tuning.

14. The method of claim 11, wherein the VCSI report is received via a physical uplink control channel or a physical uplink shared channel.

15. The method of claim 11, wherein the VCSI report is received based at least in part on a triggering event or expiration of a periodic reporting interval.

16. The method of claim 11, wherein the VCSI configuration is transmitted to an application server associated with the UE, and wherein the VCSI report is received from the application server.

17. The method of claim 11, wherein the one or more VCSI measurements include a beam identifier, one or more object detection bits that indicate whether humans or objects are present in the CSI video, and one or more unstructured bits that are derived using the machine learning model indicated in the VCSI configuration.

18. The method of claim 17, further comprising:

deriving CSI from the one or more unstructured bits using the machine learning model.

19. The method of claim 17, further comprising:

determining that the one or more object detection bits indicate that one or more humans are present in the CSI video; and configuring one or more mitigation actions to avoid transmitting a high-power beam directly toward the one or more humans.

20. The method of claim 11, further comprising:

using the one or more VCSI measurements for one or more of positioning, a measurement configuration for the UE, a mobility decision for the UE, traffic prediction, load balancing, or energy saving.

21. A method of wireless communication performed by a base station, comprising:

configuring a radio unit (RU) to capture channel state information (CSI) video;

causing the CSI video to be delivered from the RU to a distributed unit (DU) via a fronthaul interface;

deriving, by the DU, one or more video-based CSI (VCSI) measurements from the CSI video using a machine learning model; and scheduling one or more uplink or downlink transmissions based at least in part on the one or more VCSI measurements.

22. The method of claim 21, wherein the CSI video delivered to the DU is uncompressed.

23. The method of claim 21, wherein the CSI video delivered to the DU is compressed using the machine learning model.

24. The method of claim 21, wherein configuring the RU to capture the CSI video includes:

carrying, over the fronthaul interface, camera control signaling that includes one or more parameters to capture the CSI video using a camera associated with the RU.

25. The method of claim 24, wherein the one or more parameters include one or more of a camera lens identifier, focus information, a beam identifier or beam direction, camera activation or deactivation timing information, or an address to which to upload the CSI video.

26. The method of claim 21, wherein the one or more VCSI measurements include one or more object detection bits that indicate whether humans or objects are present in the CSI video.

27. The method of claim 26, further comprising:

determining that the one or more object detection bits indicate that one or more humans are present in the CSI video; and configuring one or more mitigation actions to avoid transmitting a high-power beam directly toward the one or more humans.

28. The method of claim 27, wherein the one or more mitigation actions include configuring one or more beams to avoid transmission toward the one or more humans or reducing a power associated with one or more beams that are transmitted toward the one or more humans.

29. The method of claim 21, further comprising:

reporting the one or more VCSI measurements to a central unit for one or more of positioning, a measurement configuration for the UE, a mobility decision for the UE, traffic prediction, load balancing, or energy saving.

30. A user equipment (UE) for wireless communication, comprising:

a memory; and one or more processors, coupled to the memory, configured to:

receive a video-based channel state information (VCSI) configuration;

cause a camera to capture channel state information (CSI) video based at least in part on one or more VCSI measurement parameters indicated in the VCSI configuration;

derive, from the CSI video, one or more VCSI measurements using a machine learning model indicated in the VCSI configuration; and transmit a VCSI report that includes the one or more VCSI measurements.

* * * * *